US009183739B2

(12) United States Patent
Lee

(10) Patent No.: US 9,183,739 B2
(45) Date of Patent: Nov. 10, 2015

(54) BRIDGE SAFETY MONITORING INTEGRATED SYSTEM WITH FULL OPTICAL FIBER AND THE METHOD FOR SENSING THEREOF

(71) Applicant: Zheng-Kuan Lee, Taipei (TW)

(72) Inventor: Zheng-Kuan Lee, Taipei (TW)

(73) Assignee: NATIONAL APPLIED RESEARCH LABORATORIES, Taipei (TW)

( * ) Notice: Subject to any disclaimer, the term of this patent is extended or adjusted under 35 U.S.C. 154(b) by 255 days.

(21) Appl. No.: 13/742,849

(22) Filed: Jan. 16, 2013

(65) Prior Publication Data

US 2014/0002275 A1     Jan. 2, 2014

(30) Foreign Application Priority Data

Jun. 28, 2012 (TW) .............................. 101123147 A
Jun. 28, 2012 (TW) .............................. 101212422 U

(51) Int. Cl.

| | |
|---|---|
| G08B 23/00 | (2006.01) |
| G08C 15/06 | (2006.01) |
| G08C 19/22 | (2006.01) |
| H04Q 9/00 | (2006.01) |
| G01B 11/16 | (2006.01) |

(Continued)

(52) U.S. Cl.
CPC ................ G08C 19/00 (2013.01); G01B 11/18 (2013.01); G01F 23/00 (2013.01); G01F 23/0007 (2013.01); G01F 23/2921 (2013.01); G01L 1/242 (2013.01); G01M 5/0008 (2013.01); G01M 5/0041 (2013.01); G01M 5/0091 (2013.01); G02B 6/022 (2013.01)

(58) Field of Classification Search
CPC ........... G01L 3/108; E01D 1/00; E01D 19/00; G01C 5/00; G01C 5/005; G01C 5/02

USPC ......... 340/870.02, 870.07; 356/32–34, 237.1, 356/364, 429, 432, 445, 73.1
See application file for complete search history.

(56) References Cited

U.S. PATENT DOCUMENTS

| | | | | |
|---|---|---|---|---|
| 4,477,725 | A * | 10/1984 | Asawa et al. ............. | 250/227.16 |
| 6,211,964 | B1 * | 4/2001 | Luscombe et al. ............ | 356/477 |
| 6,703,635 | B2 * | 3/2004 | Yashiro et al. ................ | 250/577 |
| 6,876,786 | B2 * | 4/2005 | Chliaguine et al. ............ | 385/13 |
| 7,027,136 | B2 * | 4/2006 | Tsai et al. ..................... | 356/73.1 |
| 7,333,680 | B2 * | 2/2008 | Yong et al. ..................... | 385/12 |
| 7,660,494 | B2 * | 2/2010 | Anderson ....................... | 385/12 |
| 7,889,332 | B2 * | 2/2011 | Omichi et al. ............... | 356/73.1 |
| 8,144,333 | B2 * | 3/2012 | Huffman ....................... | 356/480 |

(Continued)

FOREIGN PATENT DOCUMENTS

WO     WO 99/00653 A2 *   1/1999     ............ G01L 9/0076

Primary Examiner — Jennifer Mehmood
Assistant Examiner — Emily C Terrell
(74) Attorney, Agent, or Firm — Muncy, Geissler, Olds & Lowe, P.C.

(57) ABSTRACT

The present invention provides an integrated system of full optical complete bridge safety monitoring with speech warning for smart phones. The Integrated system of full optical complete bridge safety monitoring includes a stabilizing device, optical sensing device and communication device. The basic structure involves cable and optical fiber connecting two ends and joined by heat shrink tubes. A measuring segment is located between two heat shrink tubes. The stabilizing device provides a pre-determined tensile strength to the measuring segment. The optical fiber sensing device detects a response via a Fiber Bragg grating in the optical fiber's measuring segment. When the measuring segment receives a response, it changes from first phase to second phase and creates a signal change from the reflected signals. Signal processing device converts the signal changes to physical parameters. The communication device sends warning signals to users. Warning signals are sent to users' smart phones, to proactively inform the bridge's safety status with speeches.

19 Claims, 19 Drawing Sheets

(51) Int. Cl.
  *G01N 21/00* (2006.01)
  *G01J 4/00* (2006.01)
  *G01N 21/84* (2006.01)
  *G01N 21/55* (2014.01)
  *G08C 19/00* (2006.01)
  *G01M 5/00* (2006.01)
  *G01L 1/24* (2006.01)
  *G01F 23/00* (2006.01)
  *G01F 23/292* (2006.01)
  *G02B 6/02* (2006.01)

(56) References Cited

U.S. PATENT DOCUMENTS

2003/0174924 A1* 9/2003 Tennyson .................. 385/12
2006/0126055 A1* 6/2006 Meneely et al. ............ 356/28.5
2007/0103670 A1* 5/2007 Sezerman et al. .......... 356/73.1
2007/0116402 A1* 5/2007 Slade et al. ................. 385/12
2012/0257209 A1* 10/2012 Andersen et al. ........... 356/477

* cited by examiner

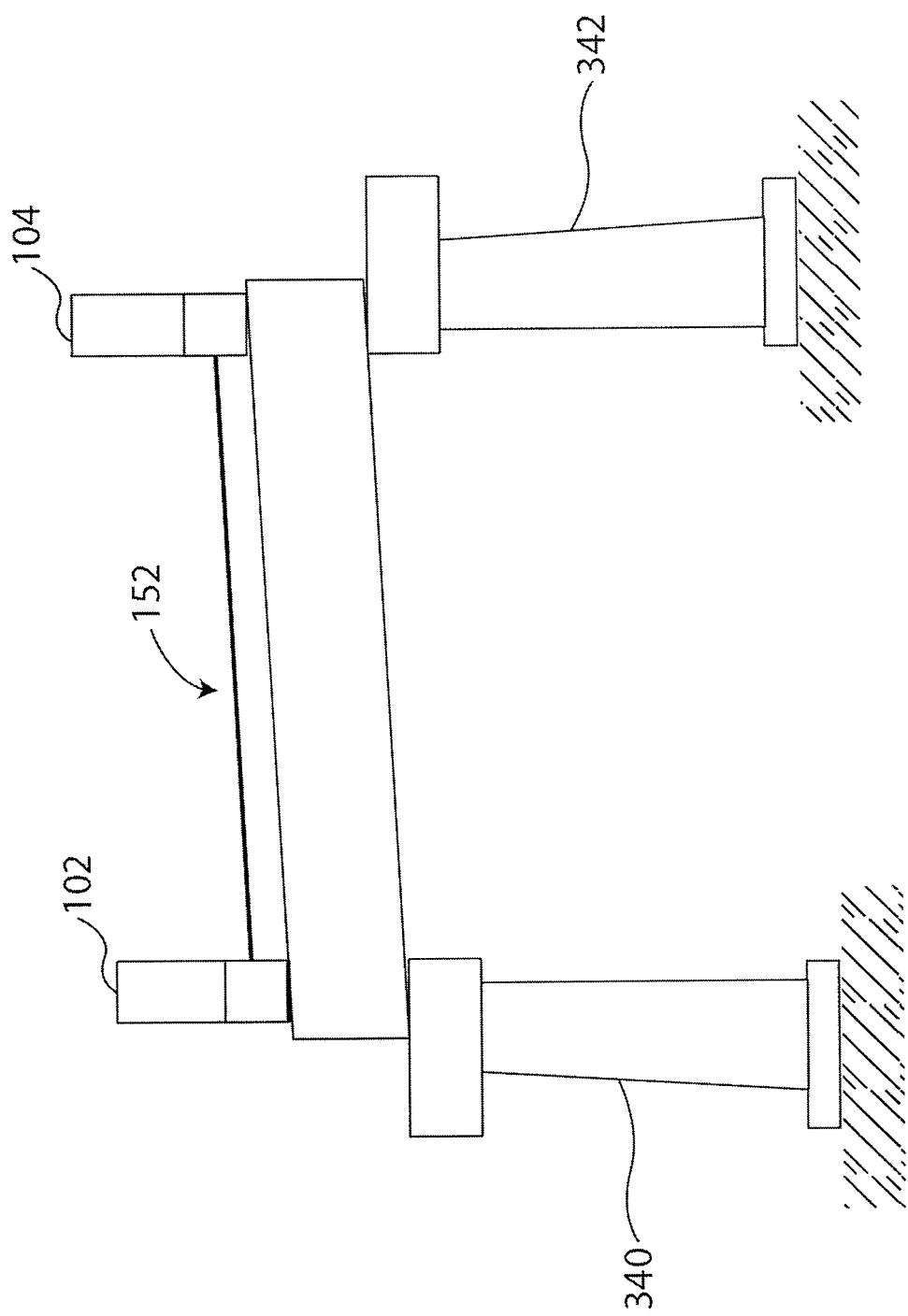

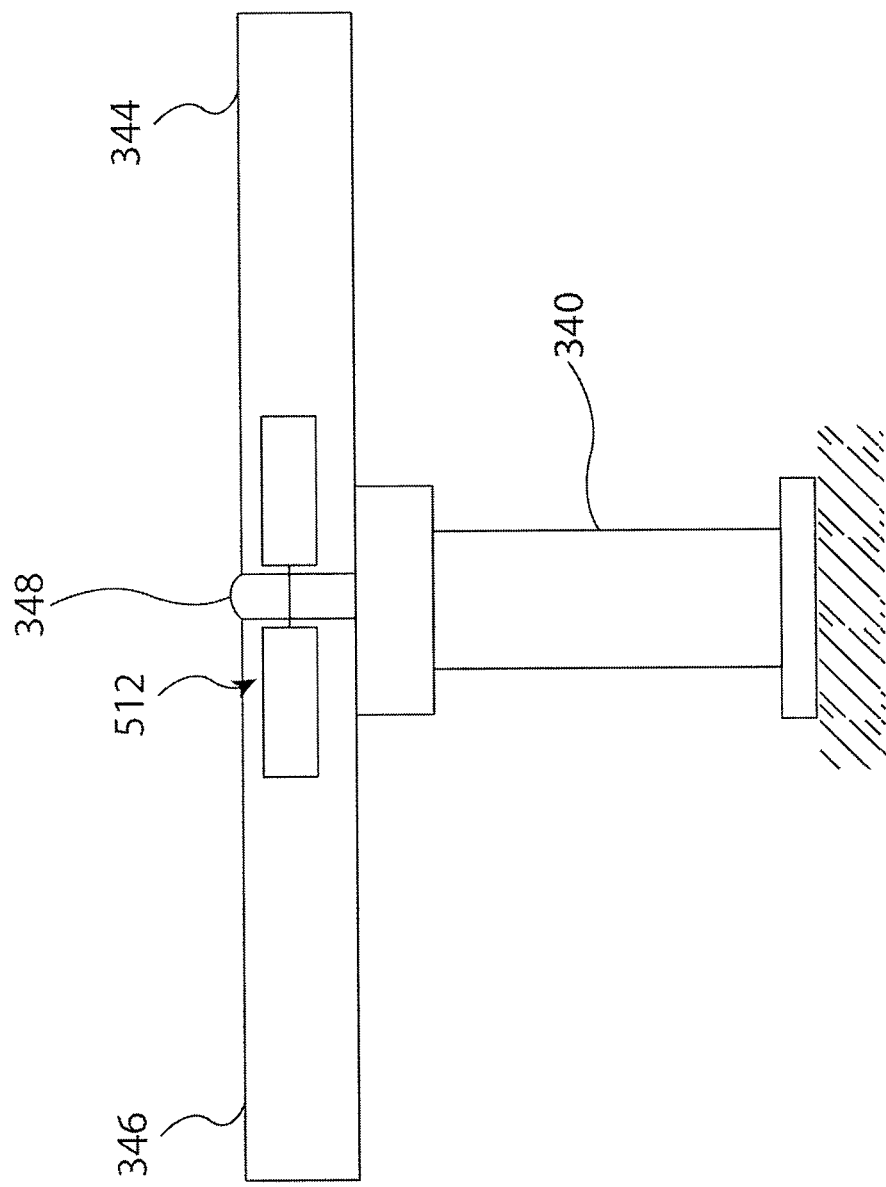

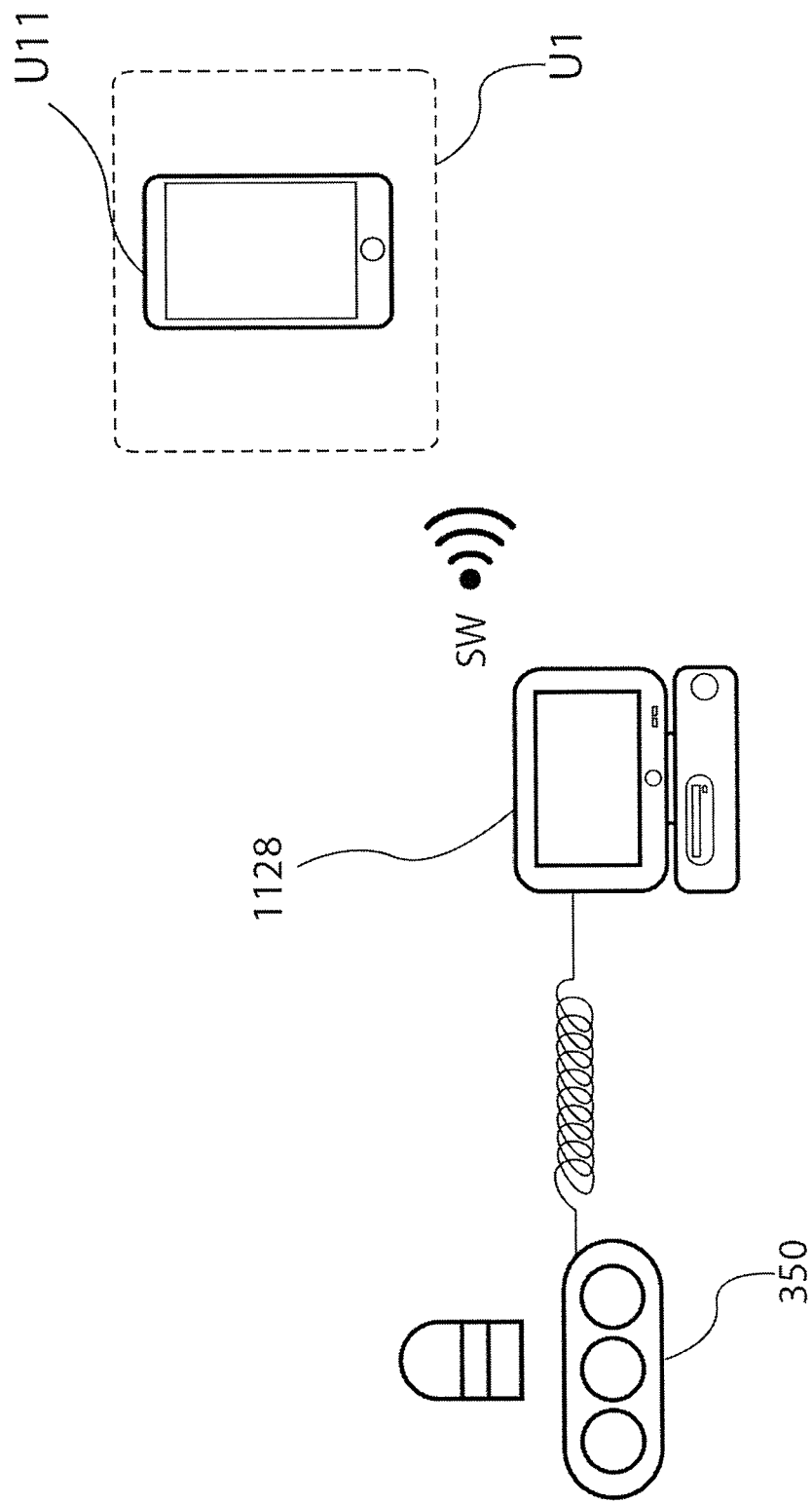

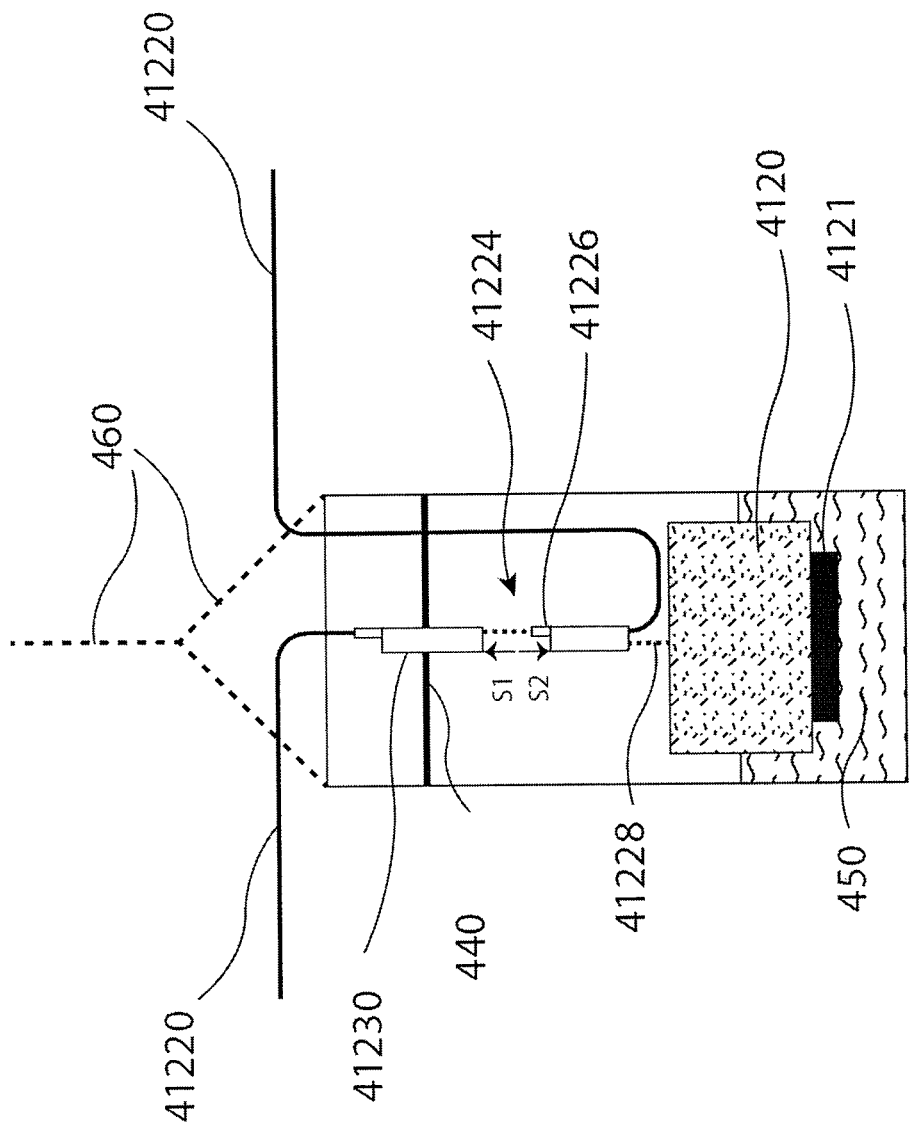

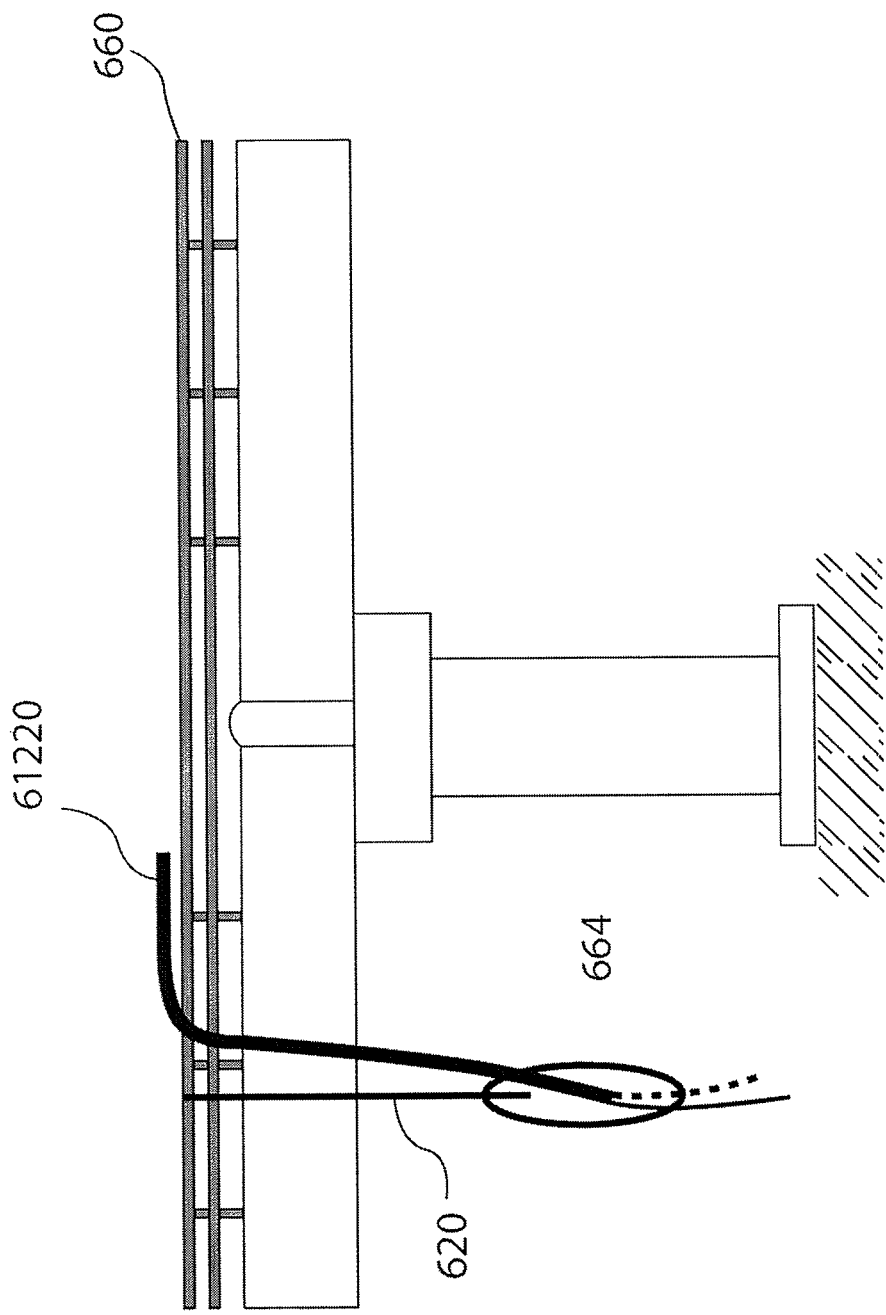

BRIDGE SAFETY MONITORING INTEGRATED SYSTEM WITH FULL OPTICAL FIBER AND THE METHOD FOR SENSING THEREOF

BACKGROUND OF THE INVENTION

1. Field of Invention

The present invention relates to an integrated system of full optical complete bridge safety monitoring with smart phone speech warning function. It is particularly relating to an integrated system of full optical complete bridge safety monitoring that is equipped with Fiber Bragg grating and communication device. The system is used to measure bridge structure in real time and send warning signals to user ends via communication device instantly. Warning signals are then sent to the user's mobile phone and to notify the user the latest status of bridge safety.

2. Description of Prior Art

Public Infrastructure is essential to people's lives and properties. Constructions of infrastructure facilities such as bridges, roads, tunnels, reservoirs, and harbors, are reaching saturation. The development and management of infrastructure are shifting from construction to maintenance. On the other hand, conservation of water and soil was not prioritized in early years. Frequent natural disasters such as typhoon and earth quacks are adding to the instability of aquatic and geographic environment.

Many newly-completed infrastructure facilities already have structural issues within their designed service years. On the other hand, service years of older infrastructures need to be extended due to economic considerations. Therefore real time monitoring systems are required to monitor such infrastructures' conditions. Structures have to be under long term monitoring so that unforeseen safety issues can be discovered in time. Therefore appropriate repairs or maintenances can be carried out before the loss of lives and properties is incurred due to structural damages to infrastructures.

The emphasis of structural monitoring is gradually shifting from the construction stage to the operation stage. Remote and real-time monitoring can effectively reduce costs and enhance early warming functions. It helps in prioritizing budget allocation in maintenance, repair and replacement. It is an essential measure for building a management system for infrastructure safety.

New developments, such as the high speed railway and other important constructions, require a higher structural standard of quality, safety and service years than average infrastructure developments. Therefore a monitoring system plays an important role to ensure their safety and service functions.

The present invention is to provide an economical and efficient measuring technique which helps bridge management to execute routine checks. Bridge safeties are monitored in real time during earthquakes or floods. Should incidents occur, warnings are given instantly to provide road users protection and disaster management.

SUMMARY OF THE INVENTION

The present invention is to provide an integrated system of full optical complete bridge safety monitoring with smart phone speech warning function and its detecting method. It is particularly related to an integrated system of full optical complete bridge safety monitoring which is equipped with Fiber Bragg grating and communication device. It can be used to measure a bridge structure's altimeter, displacement meter, water level gauge, and wire vibration meter. It also sends warning signals to user ends via communication device as disaster management information.

In one exemplary embodiment, the present invention includes the following steps: (a) providing a stabilizing device, an optical fiber sensing device, an optical device, and a signal processing device; (b) providing an optical fiber, two heat shrinking tubes, a cable in said optical fiber sensing device, and providing at least one measuring device in at least one of the measuring segments in the optical fiber, wherein the two ends of said cable are connected to the two ends of said fiber using said heat shrinking tubes. One end of the said cable is connected to said stabilizing device, and the other end opposite to said stabilizing device is a securing end; (c) coupling said optical device to one end of said optical fiber sensing device, wherein said optical device emits an optical signal into said fiber, and said optical device receives a reflected signal from said measuring segment; (d) coupling said signal processing device to said optical device; (e) connecting said stabilizing device to one end of said optical sensing device to provide said measuring segment a predetermined tensile strength so that the said measuring segment is maintained in the first status; (f) applying a force to said measuring segment, so that said measurement segment changes to the second status. Once said measuring segment is in the second status, the reflected signal generates a signal change; and (g) the said signal processing device converts said signal changes into physical parameters such as distance, vibrating frequency, water level, height variance, and weight.

The aforementioned assembly including heat shrinking tubes, optical fiber, Optical Bragg grating, and cable, are the core elements of the present invention. These core elements form altimeter, displacement meter, water level gauge, and wire vibration meter.

There is another purpose of present invention. The integrated system of full optical complete bridge monitoring also provides a communication device. Said communication device is connected to the signal processing device. When reflected signal generates a signal change, said signal processing device controls communication device and sends a warning signal. The said communication device delivers warning signals through a wired or wireless network. Said warning signals are sent to users in the form of SMS (Short Message Service), e-mails or voice mails.

The said optical sensing device with Optical Bragg grating is the measuring instrument for the bridge structure. It does not only act as various measuring devices, it also sends warning signals through communication device to the bridge caretaker in case of emergency. The caretaker is informed with the bridge's current condition and therefore he is able to make appropriate decisions immediately. The spreading of disaster is hence reduced.

DESCRIPTION OF DRAWINGS

FIG. 3C is a schematic illustration of an altimeter installed between two piers of a bridge according to another embodiment of present invention.

FIG. 3D is a schematic illustration applied in the expansion joint of a bridge according to one embodiment of present invention.

FIG. 3E is a schematic illustration of an integrated system of full optical complete bridge monitoring with a smart phone speech warning according to one embodiment of present invention.

FIG. 4A is a schematic illustration of a steel wire vibration monitoring according to one embodiment of present invention.

FIG. 6B is a schematic illustration of a water level gauge of FIG. 6A installed on a bridge.

DESCRIPTION OF THE INVENTION

Figure 1A:
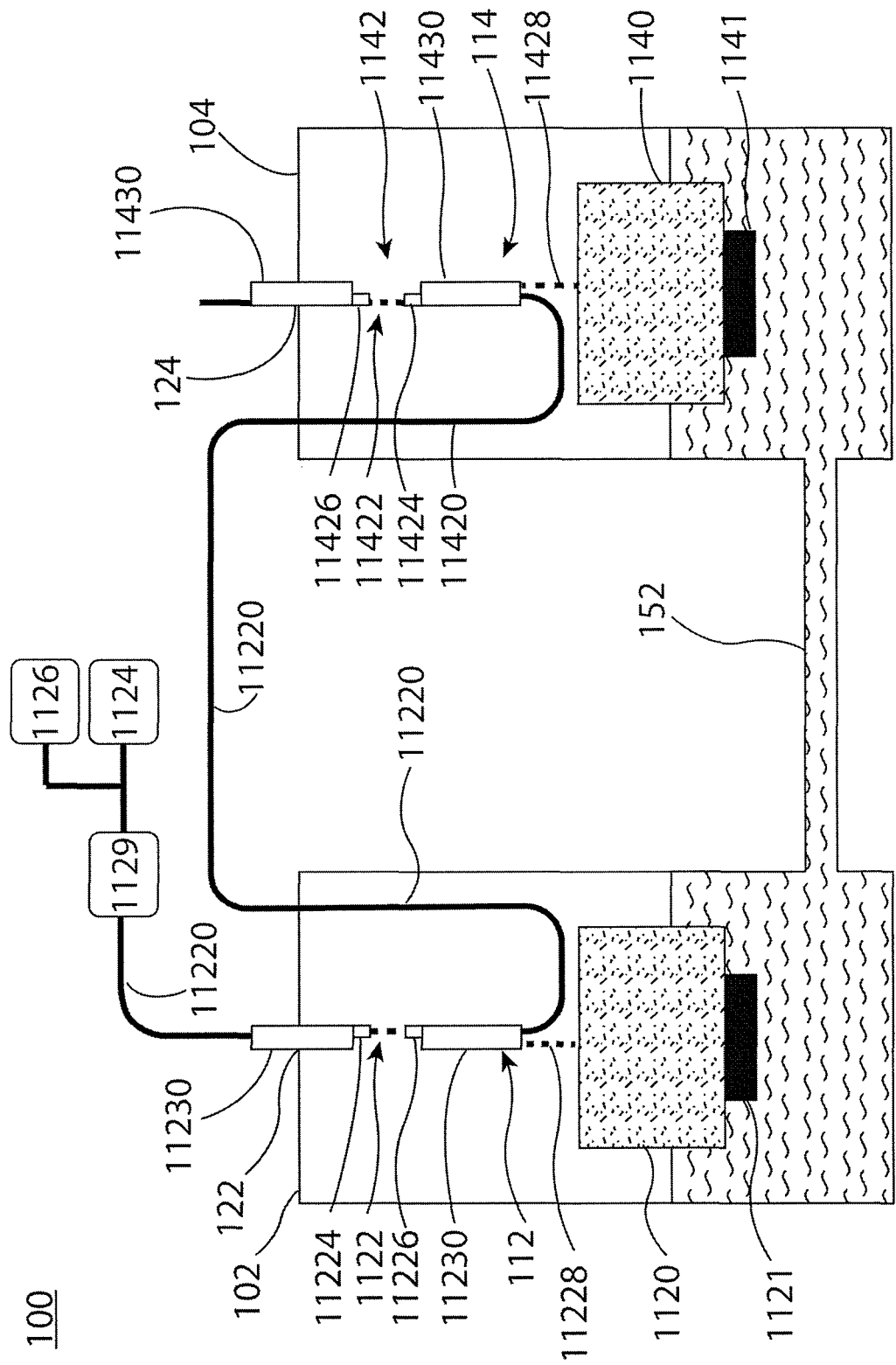
FIG. 1A is a schematic illustration of an altimeter according to one embodiment of the present invention.

Various embodiments and aspects of present invention will be described in more details with reference to figures. The figures are used to illustrate various exemplary embodiments, but not to restrict the scope of present invention.

FIG. 1 is a schematic illustration of an altimeter according to one embodiment of the present invention. As shown in FIG. 1, the altimeter 100 includes the first acrylic tube 102 and the second acrylic tube 104. The first leveling pipe 152 connects the first acrylic tube 102 and the second acrylic tube 104 is filled with liquid. The liquid in the first acrylic tube 102 is at the same level as the liquid in the second acrylic tube 104 according to the connected pipes principle. Referring to FIG. 1, the first integrated system of full optical complete bridge monitoring 112 and the second integrated system of full optical complete bridge monitoring 114 are respectively installed in the first acrylic tube 102 and the second acrylic tube 104. One end of the first integrated system of full optical complete bridge monitoring 112 is coupled with the first securing end 122, and the other end floats in the liquid through the first stabilizing device 1120. The first securing end 122 corresponds to the first heat shrinking tube 11230 of the first stabilizing device 1120. The first integrated system of full optical complete bridge monitoring 112 is secured in the first acrylic tube 102 using the first heat shrinking tube 11230. In this embodiment, the first stabilizing device 1120 is a Styrofoam cylinder. The round iron block 1121 below is connected to the first stabilizing device 1120, so that the round iron block 1121 provides a downward gravity to the first stabilizing device 1120. One end of the second integrated system of full optical complete bridge monitoring 114 is connected to the second securing end. The other end floats in the liquid through the second stabilizing device 1140.

The second securing end 124 corresponds to the second heat shrinking tube 11430 of the second stabilizing device 1140. The second integrated system of full optical complete bridge monitoring 114 is secured in the second acrylic tube 104 using the second heat shrinking tube 11430. In this embodiment, the second stabilizing device 1140 is a Styrofoam cylinder. The round metal plate 1141 below is connected to the second stabilizing device 1140, so that the round iron block 1141 provides a downward gravity to the second stabilizing device 1140.

In this embodiment, the first stabilizing device 1120 and the second stabilizing device 1140 are floating devices or Styrofoam. The other end of the first stabilizing device 1120 is connected to the first cable 11228 of the first optical sensing device 1122. The first cable is a carbon fiber line in this embodiment. The other end of the second stabilizing device 1140 is connected to the second cable 11428 of the second optical fiber sensing device 1142. The second cable is a carbon fiber line in this embodiment. The buoyant force of the first stabilizing device 1120 provides a pre-determined tensile strength to the first optical fiber sensing device 1122, so that the first measuring segment 11222 is maintained in the first status. Similarly, one end of the second integrated system of full optical complete bridge monitoring 114 is connected to the second securing end 124. The other end floats in the liquid using the second stabilizing device 1140. The buoyant force of the second stabilizing device 1140 provides a pre-determined tensile strength to the second fiber sensing device 1142, so that the second measuring segment 11422 is maintained in the first status.

In this embodiment, altimeter 100 comprises of two acrylic tubes and two sets integrated system of full optical fiber complete bridge monitoring. However, altimeter 100 might comprise other numbers of acrylic tubes and integrated system of full optical complete bridge monitoring. For example, three acrylic tubes and three sets of integrated system of full optical complete bridge monitoring systems. The numbers can vary and are not limited to those described in the examples. It should be noted that the combination of quantities for acrylic tubes used for altimeters and integrated system of full optical complete bridge monitoring depends on the length of the bridge structure.

Figure 1B:
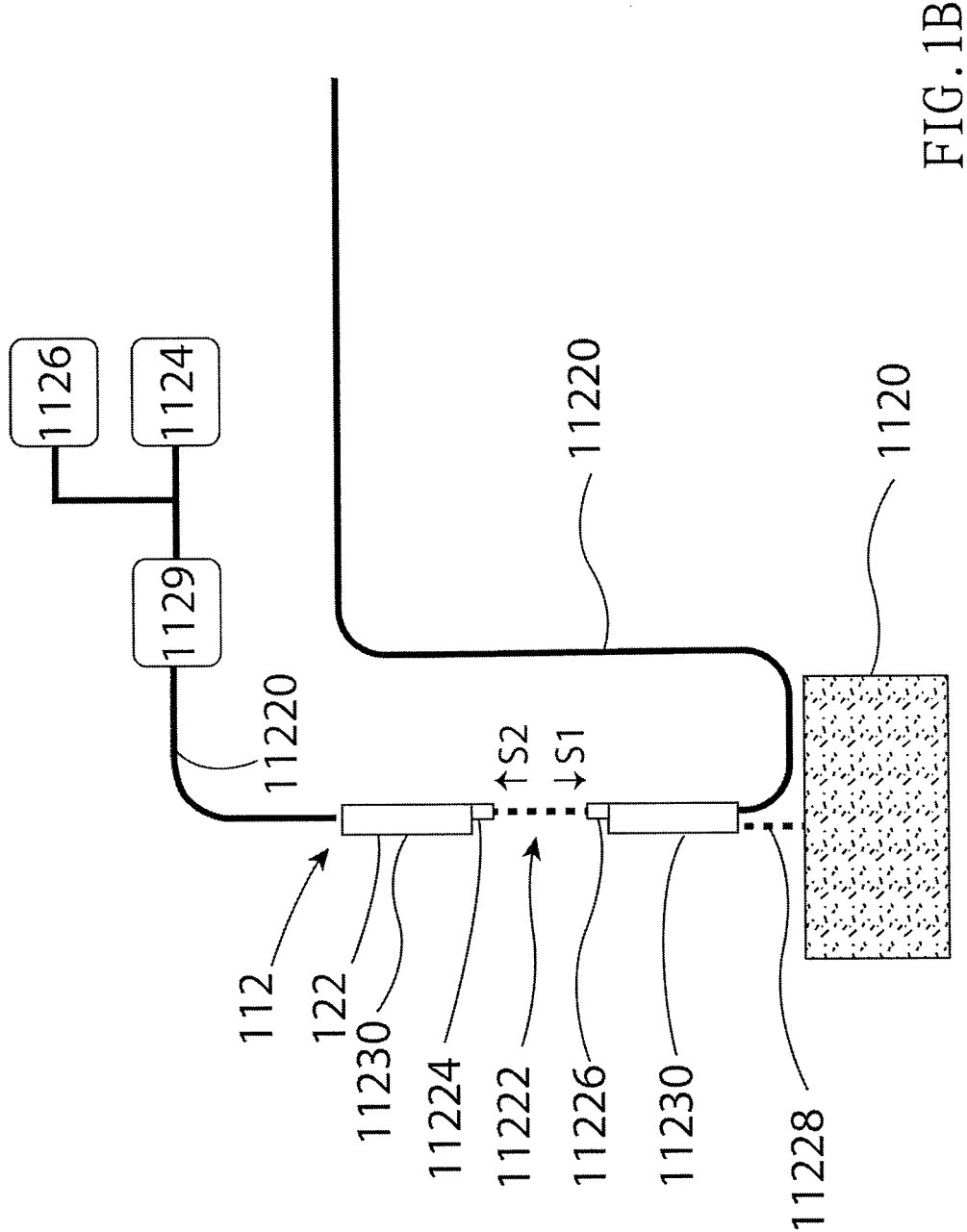
FIG. 1B is a schematic illustration of an integrated system of full optical complete bridge monitoring of the altimeter according to FIG. 1A.

FIG. 1B illustrates the first integrated system of full optical fiber complete bridge monitoring 112 according to the altimeter 100 in FIG. 1A. The first integrated system of full optical complete bridge monitoring 112 includes: the first stabilizing device 1120, the first fiber sensing device 1122, the first optical device 1124, and the first signal processing device 1126. The first optical fiber sensing device 1122 comprises: the first optical fiber 11220, the first measuring segment 11222, the first measuring device 11224, the first piping device 11226, the first cable 11228, and two first heat shrinking tubes 11230. The first heat shrinking tube 11230 contracts when heated. Two ends of the first cable 11228 are respectively coupled to two ends of the first optical fiber 11220 through the first heat shrinking tubes 11230. The first measuring segment 11222 is in the first optical fiber 11220, and is located between the two first heat shrinking tubes 11230. The first measuring device 11224 is located in the first measuring segment 11222 of the first optical fiber 11220.

The first piping device 11226 covers the first optical fiber 11220 and the first measuring segment 11222 to protect the first optical fiber 11220 and the first measuring segment 11222. One end of the first measuring segment 11222 is coupled with the first stabilizing device 1120. In this embodiment, the first measuring device 11224 is an Optical Bragg grating. The first optical device 1124 is located in one end of the first optical fiber sensing device 1122. The first optical device 1124 emits an optical signal S1 into the first optical fiber 11220, and the optical signal S1 is reflected by the first measuring segment 11222 to generate a reflected signal S2. The first optical device 1124 receives the reflected signal S2. The optical signal S1 is a wideband optical signal. When the optical signal S1 has a specific wavelength that satisfies Optical Bragg grating condition while passing through the first measuring device 11224, it is reflected to the first optical device 1124 and hence become the reflected signal S2. The first signal processing device 1126 is coupled with the first optical device 1124. The first optical device 1124 and the first signal processing device 1126 are coupled with the first optical fiber sensing device 1122 through the first coupler 1129. The first stabilizing device 1120 is coupled with the first optical fiber sensing device 1122 to provide a pre-determined tensile strength to the first measuring segment 11222 so that the first measuring segment 11222 is maintained in the first status. The first piping device 11226 is used to transmit a change to the first measuring segment 11222 of the first optical fiber sensing device 1122.

When the force applied to the first measuring segment 11222 is changed, the first measuring segment changes from the first status to the second status due to the change in applied tensile force. The reflected signal S2 generates a signal change. The first signal processing device 1126 converts the signal change into a physical parameter. The first signal processing device 1126 transmits a warning signal Sw to a user U1 when the reflected signal S2 generates a signal change. It should be noted that FIG. 1B illustrates the first integrated system of full optical complete bridge monitoring 112 as an example. The structure and operation principle are the same for the second integrated system of full optical complete bridge monitoring 114.

Figure 1C:
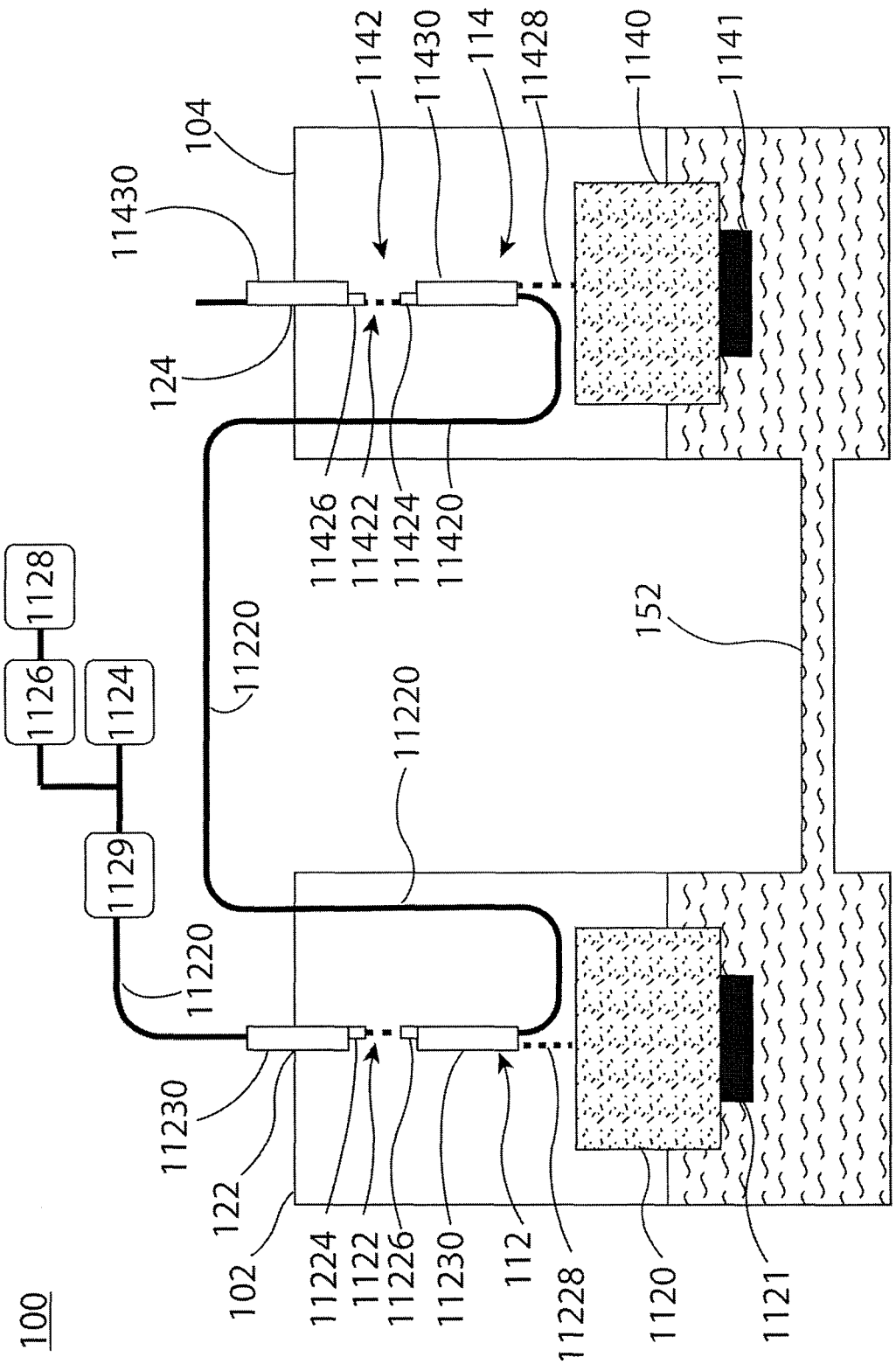
FIG. 1C is a schematic illustration of an altimeter according to one embodiment of the present invention.
Figure 1D:
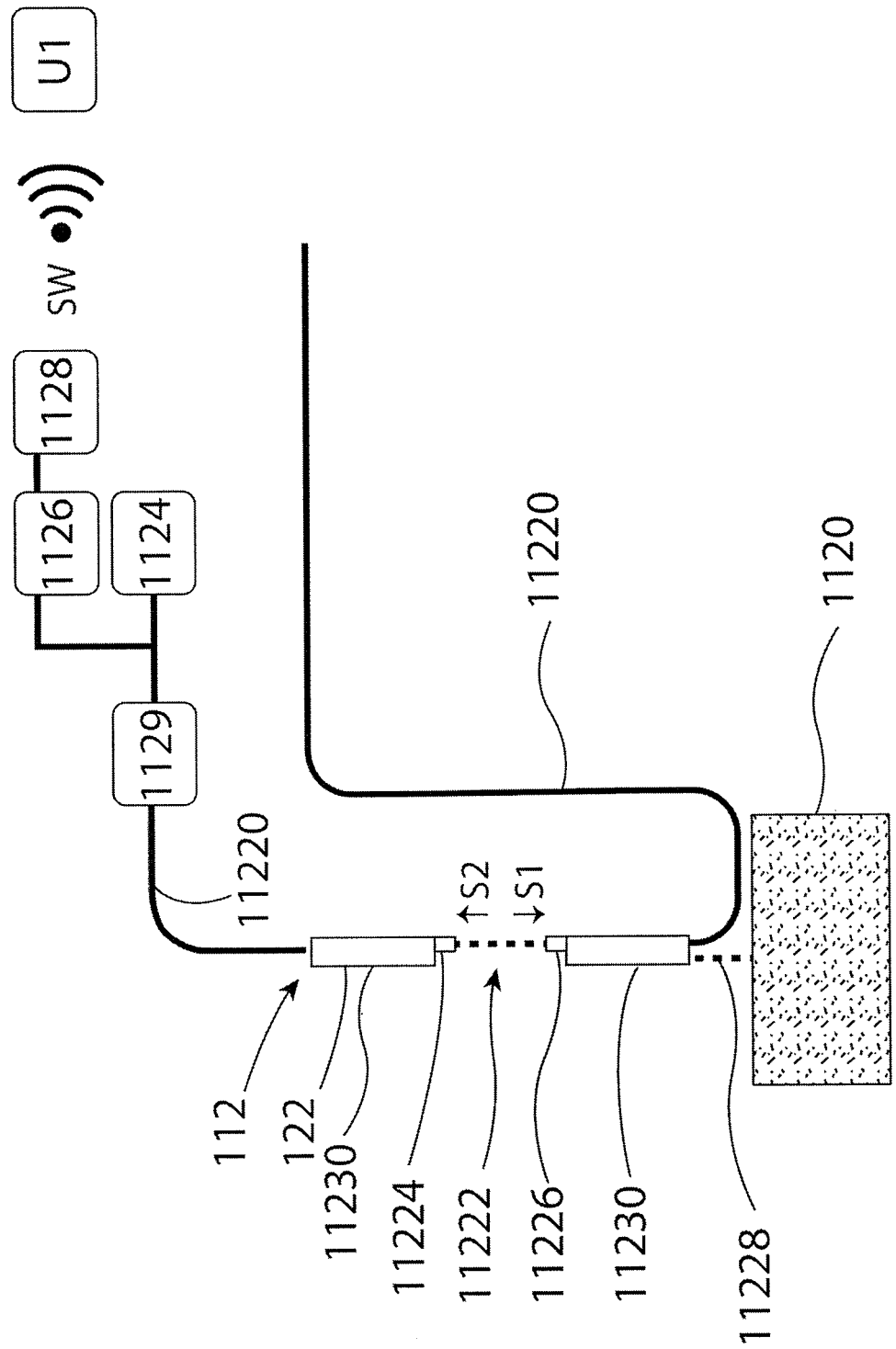
FIG. 1D is a schematic illustration of an integrated system of full optical complete bridge monitoring of the altimeter according to FIG. 1C.
Figure 2A:
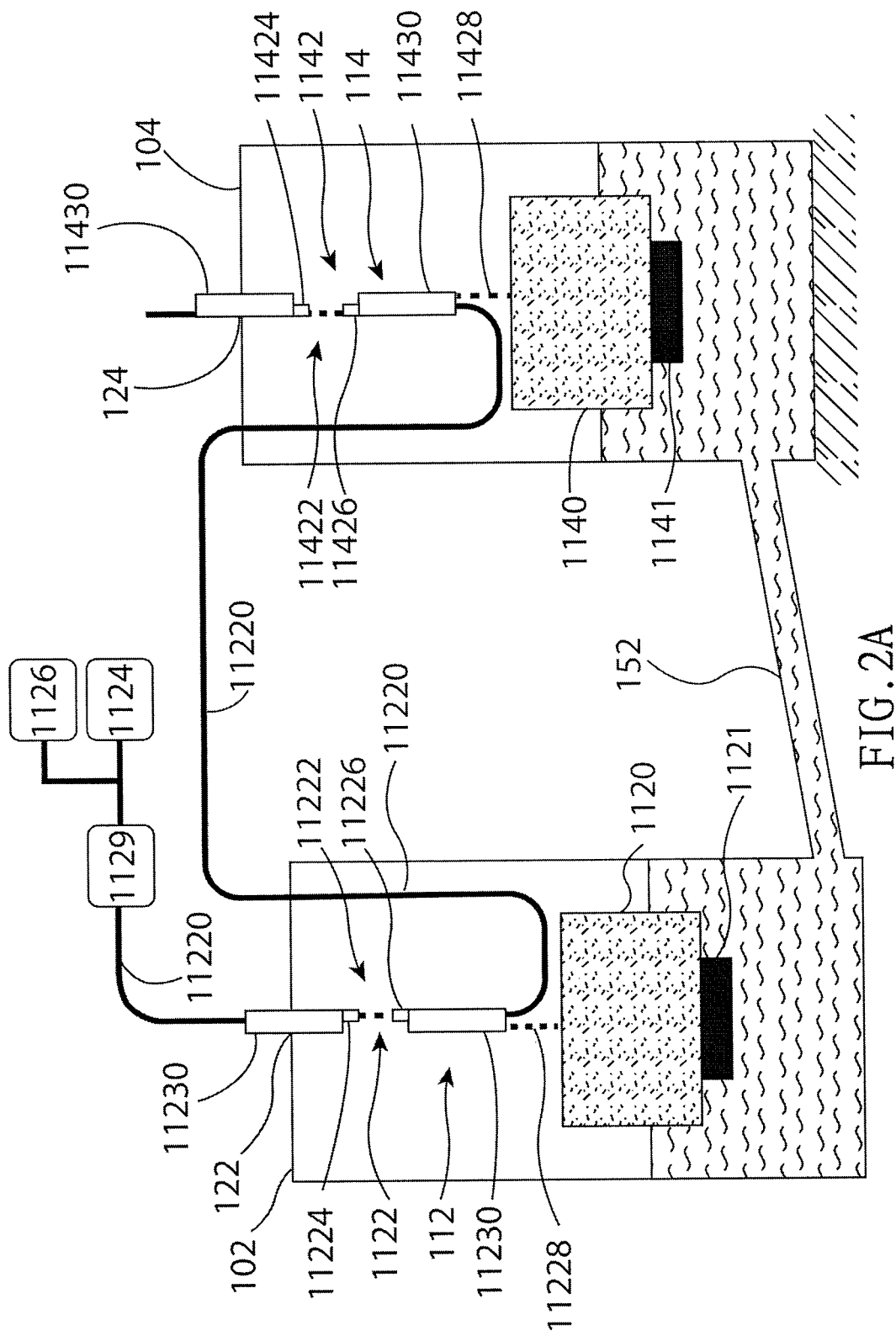
FIG. 2A is a schematic illustration of an altimeter according to one embodiment of the present invention.

Please refer to FIGS. 1A, 1B, and 2A. FIG. 2A is a schematic illustration of an altimeter according to one embodiment of the present invention. In this embodiment, the altimeter 100 is the same as the altimeter 100 in FIG. 1. FIG. 2A illustrates an embodiment where the acrylic tube 102 of the altimeter 100 sinks. When the first acrylic tube 102 sinks, the first securing end sinks with it. The first heat shrinking tube 11230 prompts the first optical fiber sensing device 1122 to move.

Eventually, the buoyant force of the first stabilizing device 1120 of the first integrated system of full optical complete bridge monitoring system 112 is changed by the conduction of the first cable 11228. Hence the first integrated system of full optical complete bridge monitoring 112 is able to detect the occurrence of the sinking event. In this embodiment, the first stabilizing device 1120 and the second stabilizing device 1140 are floating devices or Styrofoam.

The first acrylic tube 102 and the second acrylic tube 104 are connected by the first leveling pipe 152. The liquid level in the first acrylic tube 102 is the same as the liquid level in the second acrylic tube 104. FIG. 3B is a schematic illustration of an altimeter being installed between two piers of a bridge. The first acrylic tube 102 and the second acrylic tube 104 are installed on the bridge piers 340 and 342 respectively. The bridge piers 340 and 342 are on the same horizontal level under normal conditions. Therefore the liquid level in the first acrylic tube 102 and the second acrylic tube 104 is on the same horizontal level.

The first stabilizing device 1120 has a stronger buoyant force when its immersed volume is higher and the depth is deeper. It subsequently changes the tensile strength of the first cable 11228 of the first optical fiber sensing device 112. The first measuring segment 11222 of the optical fiber 11220 changes from the first status to the second status. The first optical device 1124 emits an optical signal S1 into the first measuring device 11224 (which is an Optical Bragg Grating) of the first optical fiber 11220. Reflected signal S2, which is a reflection of optical signal S1, generates a signal change because the first measuring segment 11222 changes from the first status to the second status. The first signal processing device 1126 converts such signal change to a physical parameter, which is the value of the height being dropped. It also informs the users and achieves the purpose of real time monitoring and early warning.

FIG. 3C is a schematic illustration of an altimeter which is installed between two piers of a bridge according to another embodiment. In practice, when the pier 340 sinks, the first acrylic tube 102 also sinks as shown in FIG. 3C. Therefore, the first integrated system of full optical complete bridge monitoring 112 receives a downward tensile force. The first optical fiber sensing device 1122 is also pulled downwards. As a result, the first stabilizing device 1120 also pulls the first optical fiber sensing device 1122.

Please refer to FIG. 1C, 1D, where FIG. 1C is a schematic illustration of an altimeter 100 according to one embodiment of the present invention. FIG. 1D is a schematic illustration of the integrated system of full optical fiber complete bridge monitoring 112 of the altimeter according to FIG. 1C. The altimeter 100 includes the first acrylic tube 102 and the second acrylic tube 104. The first leveling pipe 152 connects the first acrylic tube 102 and the second acrylic tube 104. The liquid level in the first acrylic tube 102 is the same as the liquid level in the second acrylic tube 104 according to the connected pipes principle. The first integrated system of full optical complete bridge monitoring 112 is in the first acrylic tube 102, and the second integrated system of full optical complete monitoring system 114 is in the second acrylic tube 104.

As illustrated, one end of the first integrated system of full optical complete bridge monitoring 112 is connected to the first securing end 122. The other end floats in liquid through the first stabilizing device 1120. As opposite to the first heat shrinking tube 11230 of the first stabilizing device 1120 is the first securing end 122. The first integrated system of full optical complete bridge monitoring 112 is fixed onto the first acrylic plastic tube 102 using the first heat shrinking tube 11230. The first integrated system of full optical complete bridge monitoring 112 floats in the liquid through the first stabilizing device 1120. In this embodiment, the first stabilizing device 1120 is an Styrofoam cylinder. The round metal block 1121 is below and connected to the first stabilizing device 1120, so that the round metal 1121 provides a downwards gravity to the first stabilizing device 1120.

One end of the second integrated system of full optical complete bridge monitoring 114 is connected to the second securing end 122. The other end floats in liquid through second stabilizing device 1140. The second heat shrinking tube 11430 of the second stabilizing device 1140 corresponds to the second securing end 124. In this embodiment, the second stabilizing device 1140 is a Styrofoam cylinder. The round metal block 1141 is below and connected to the second stabilizing device 1140, so that the round metal block 1141 provides a downwards gravity to the second stabilizing device 1140.

In this embodiment, the first stabilizing device 1120 and the second stabilizing device 1140 are floating devices or Styrofoam. The other end of the first stabilizing device 1120 is connected to the first cable 11228 of the first optical fiber sensing device 1122. The first cable 11228 is a carbon fiber line. The other end of the second stabilizing device 1140 is connected to the second cable 11428 of the second optical fiber sensing device 1142. The second cable 11428 is a carbon fiber line. The buoyant force of the first stabilizing device 1120 provides a pre-determined tensile strength to the first fiber sensing device 1122, so that the first measuring segment 11222 is maintained in a first state. Similarly, the other end of the second stabilizing device 1140 is connected to the second securing end 124. The other end floats in liquid through the second stabilizing device 1140. The buoyant force of the second stabilizing device 1140 provides a pre-determined tensile force to the second optical fiber sensing device 1142, so that the second measuring segment 11422 is maintained in the first status.

In this embodiment, the altimeter 100 includes two acrylic tubes and two sets of integrated system of full optical complete bridge monitoring. However, the altimeter may include other numbers of acrylic tubes and integrated system of full optical fiber complete monitoring. For example, three acrylic tubes and three sets of integrated systems of full optical fiber monitoring. The combination and numbers are used to describe the embodiment, but not in the sense of limiting. It should be noted that the combination and numbers of acrylic tubes and integrated systems of full optical compete bridge monitoring used in the altimeter depend on the length of bridge structure.

Referring to FIG. 1D, the first integrated system of full optical complete bridge monitoring system 112 includes: the first stabilizing device 1120, the first optical fiber sensing device 1122, the first optical device 1124, and the first signal processing device 1126. The first optical fiber sensing device 1122 comprises: the first optical fiber 11220, the first measuring segment 11222, the first measuring device 11224, the first piping device 11226, the first cable 11228, and two first heat shrinking tubes 11230. The first heat shrinking tube 11230 contracts when heated. Two ends of the first cable 11228 are connected to two ends of the first optical fiber 11220 through the first heat shrinking tubes 11230 respectively. The first measuring segment 11222 is in the first optical fiber 11220 and located between the two first heat shrinking tubes 11230. The first measuring device 11224 is located in the first measuring segment 11222 of the first optical fiber 11220.

The first piping device 11226 covers the first optical fiber 11220 and the first measuring segment 11222 to protect the first optical fiber 11220 and the first measuring segment 11222. One end of the first measuring segment 11222 is coupled with the first stabilizing device 1120. In this embodiment, the first measuring device 11224 is an Optical Bragg Grating.

The first optical device 1124 is installed in one end of the first optical fiber sensing device 1122. The first optical device 1124 emits an optical signal S1 into the first optical fiber 11220. The optical signal S1 is reflected by the first measuring segment 11222 to generate a reflected signal S2. The first optical device 1124 receives the reflected signal S2. The optical signal S1 is a wideband optical signal. When the optical signal S1 has the specific wavelength that satisfies the Optical Bragg grating condition while passing through the first measuring device 11224, it is reflected to the first optical device 1124 and hence become the reflected signal S2.

The first signal processing device 1126 is coupled with the first optical device 1124. The first optical device 1124 and the first signal processing device 1126 are coupled to the first optical fiber sensing device 1122 through the first coupler 1129. The first stabilizing device 1120 is coupled with the first optical fiber sensing device 1122 to provide a pre-determined tensile strength to the first measuring segment 11222 so that the first measuring segment 11222 is maintained in the first status. The first piping device 11226 is used to transmit a change to the first measurement segment 11222 of the first optical fiber sensing device 1122.

When the force applied to the first measuring segment 11222 changes, the first measuring segment 11222 changes from the first status to the second status due to the change in the tensile strength. The reflected signal S2 generates a signal change. Subsequently, the first signal processing device 1126 transforms the reflected signal S2 into a physical parameter. The first signal processing device 1126 transmits a warning signal Sw to a user U1 when the reflected signal S2 changes. It should be noted that FIG. 1D only illustrates the first integrated system of full optical complete bridge monitoring 112 as an example. The structure and operation principle are the same for the second integrated system of full optical fiber complete bridge monitoring system 114.

Figure 2B:
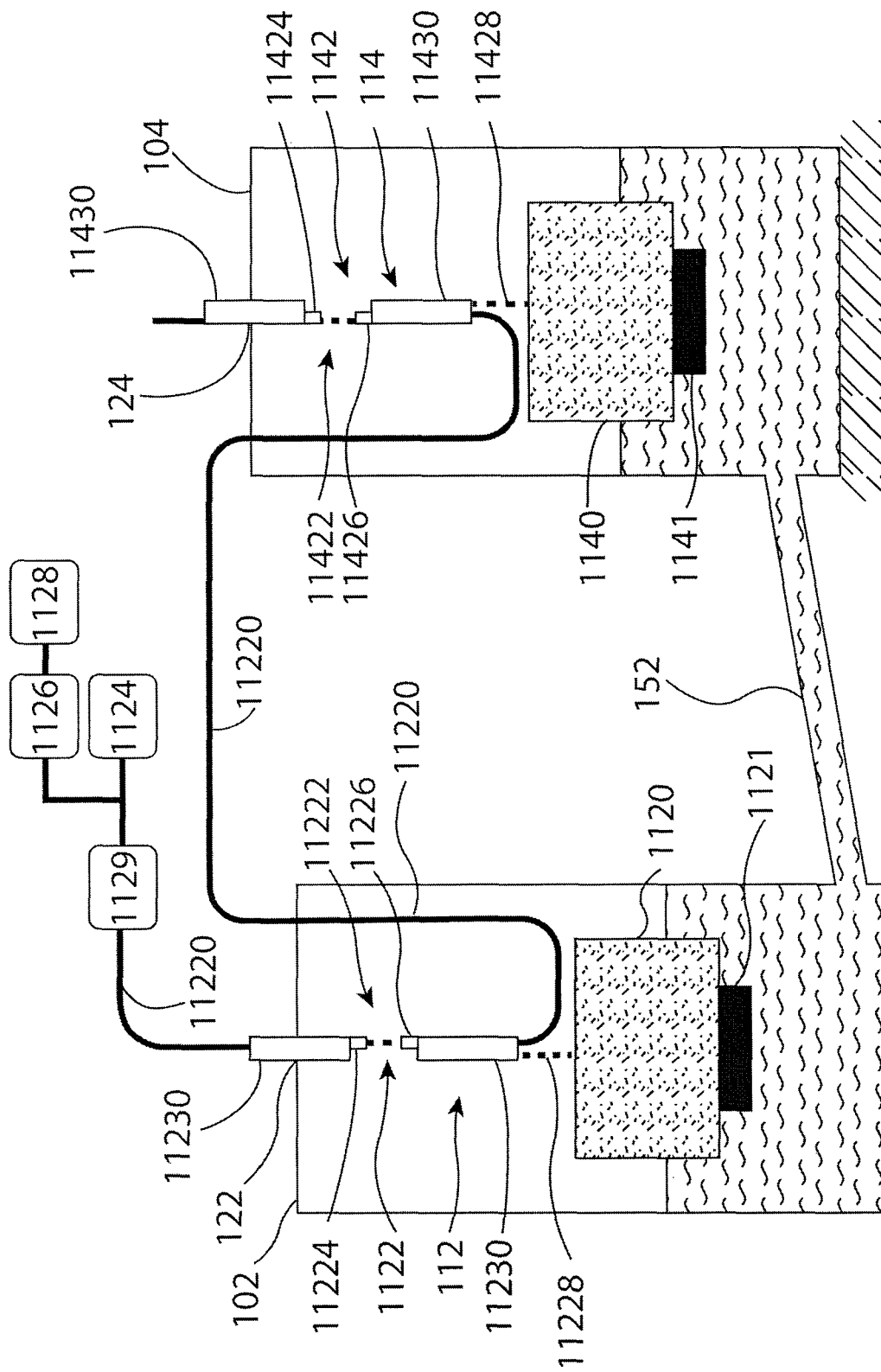
FIG. 2B is a schematic illustration of an altimeter according to one embodiment of present invention.

Please refer to FIGS. 1C, 1D, and 2B. FIG. 2B is a schematic illustration of an altimeter according to another embodiment of the present invention. In this embodiment, the altimeter 100 is the same as the altimeter 100 in the FIG. 1C. FIG. 2B illustrates that the first acrylic tube 102 of the altimeter 100 sinks. The first securing end 122 sinks when the first acrylic tube 102 sinks. At the same time, the first heat shrinking tube 11230 prompts the first fiber sensing device 1122 to move. Eventually, the buoyant force of the first stabilizing device 1120 of the first integrated system of full optical complete bridge monitoring 112 is changed by the conduction of the first cable 11228. The first integrated system of full optical complete bridge monitoring 112 detects the sinking event. The first stabilizing device 1120 and the second stabilizing device 1140 are floating devices or Styrofoam in this embodiment.

The first acrylic tube 102 and the second acrylic tube 104 are connected by the first leveling pipe 152. The liquid level in the first acrylic tube 102 is the same as the liquid level in the second acrylic tube 104. FIG. 3B is a schematic illustration of an altimeter installed between two piers of a bridge. The first acrylic tube 102 and the second acrylic tube 104 are installed on the bridge piers 340 and 342 respectively. The bridge piers 340 and 342 are at the same horizontal level under normal conditions. The liquid level in the first acrylic tube 102 and the second acrylic tube 104 are at the same level. The first stabilizing device 1120 has a stronger buoyant force when its immersed volume is higher and the depth is deeper. It subsequently changes the tensile strength of the first cable 11228 of the first optical fiber sensing device 112. The first measuring segment 11222 of the optical fiber 11220 changes from the first status to the second status. The first optical device 1124 emits an optical signal S1 into the first measuring device 11224 (which is an Optical Bragg Grating) of the first optical fiber 11220. Reflected signal S2, which is a reflection of optical signal S1, generates a signal change because the first measuring segment 11222 changes from the first status to the second status. The first signal processing device 1126 converts such signal change to a physical parameter, which is the value of the height being dropped. It also informs the users and achieves the purpose of real time monitoring and early warning.

Referring to FIGS. 1C, 1D, and 2B, the first integrated system of full optical complete bridge monitoring 1120 includes the first communication device 1128. The first communication device 1128 is coupled with the first signal processing device 1126. The first signal processing device 1126 transmits a warning signal Sw to a user U1 through the first communication device 1128 when the reflected signal S2 changes. The warning signal Sw is transmitted to a user in the form of SMS (Short Messages Service), e-mails or voice messages.

FIG. 3E is a schematic illustration of another embodiment of the present invention, an integrated system of full optical complete bridge monitoring with smart phone speech warning function. Referring to FIG. 3E, the first communication device 1128 sends a warning signal Sw to the cell phone U11 of the bridge caretaker U1 via a network. At the same time, the first communication device 1128 also activates a warning device 350 such as a warning light, alarm, or warning voice to alert road users.

Figure 3A:
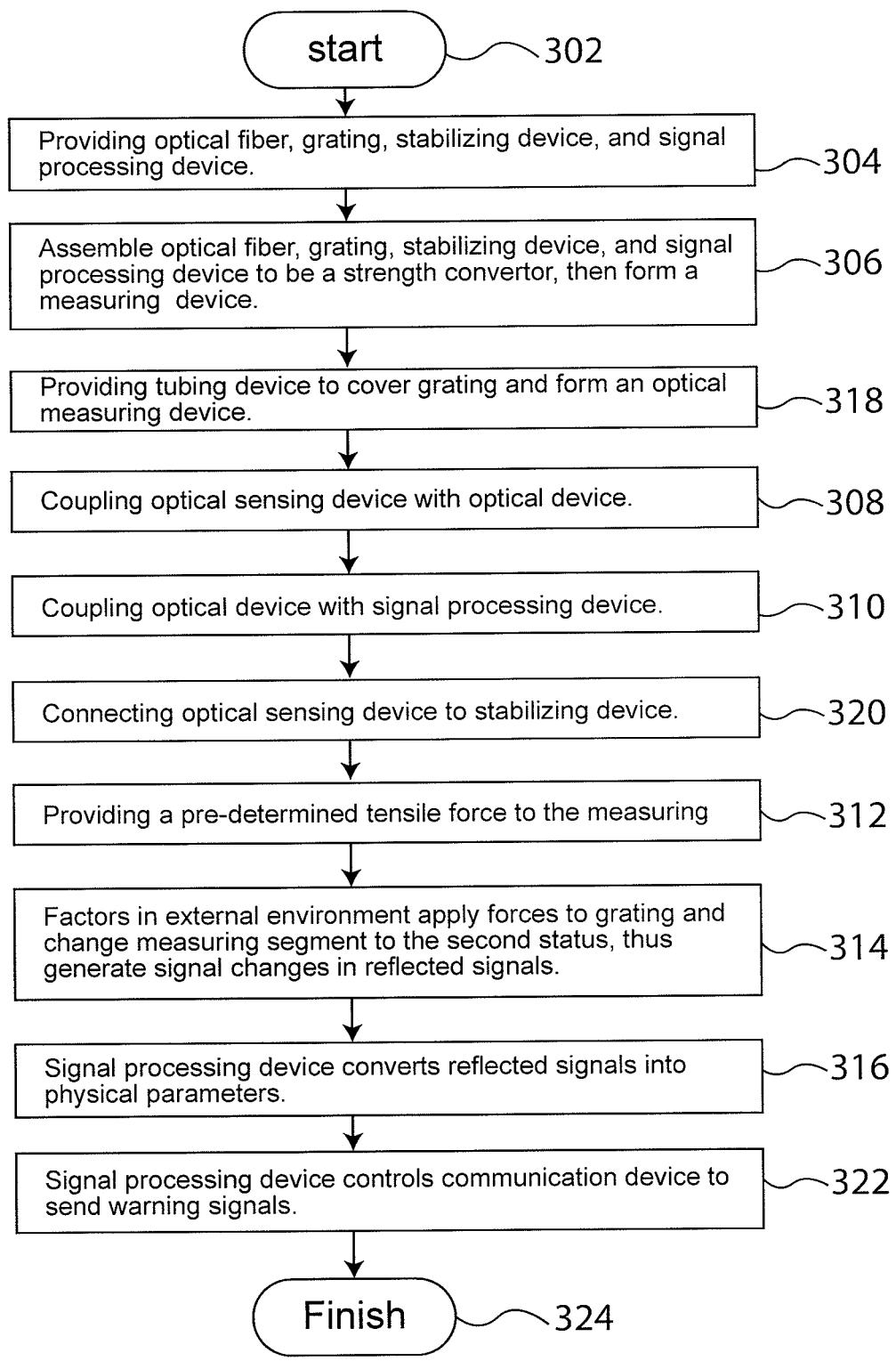
FIG. 3A is a flow chart of the sensing method according to one embodiment of present invention.
Figure 3B:
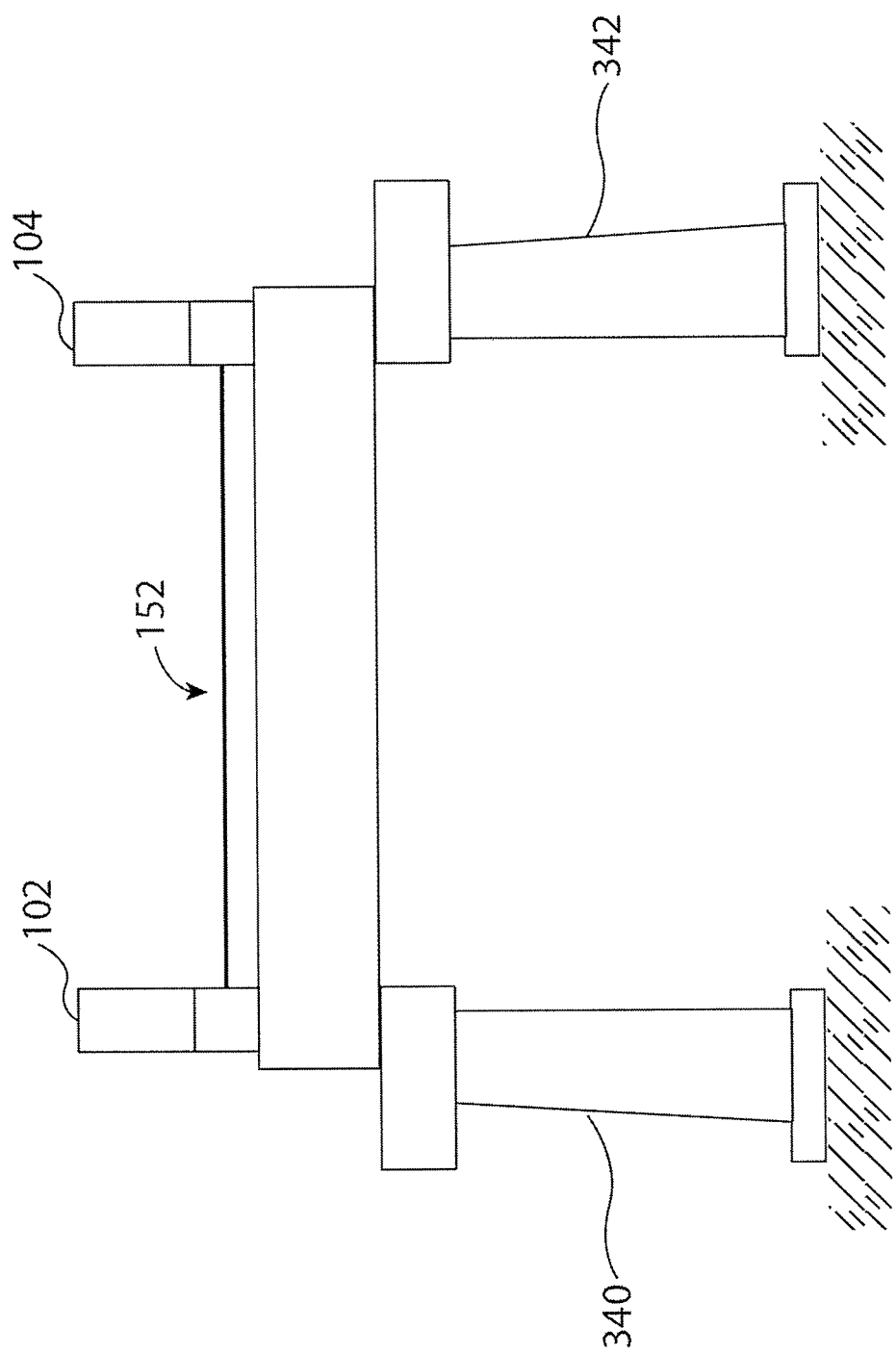
FIG. 3B is a schematic illustration of an altimeter installed between two piers of a bridge according to one embodiment of present invention.

The present invention also provides a detecting method as shown in FIG. 3A.

Referring to FIG. 1A, 1B, 2, the detecting method includes the following:

In step 304, the first optical fiber sensing device 1122, the second optical fiber sensing device 1142, the first optical fiber 11220, the second optical fiber 11420, the first optical device 1124, the second optical device 1144, the first signal processing device 1126, the second signal processing device 1146, the first stabilizing device 1120, and a second stabilizing device 1140 are provided.

As shown in FIGS. 1A and 1B, the altimeter 100 includes the first acrylic tube 102 and the second acrylic tube 104. The first acrylic tube 102 and the second acrylic tube 104 are connected by the first leveling pipe 152. Therefore the liquid level in the first acrylic tube 102 is the same as the liquid level in the second acrylic tube 104 when the two acrylic tubes are at the same horizontal level. The first stabilizing device 1120 and the second stabilizing device 1140 are of the same volume and material.

Therefore, the first stabilizing device 1120 and the second stabilizing device 1140 are both at the same horizontal level. In practice, FIG. 3B is a schematic illustration of an embodiment of the present invention where an altimeter is installed between two piers of a bridge. The first acrylic tube 102 and the second acrylic tube 104 are installed on the bridge piers 340 and 342 respectively. The bridge piers 340 and 342 are installed at the same horizontal level. The liquid level in the first acrylic tube 102 and the second acrylic tube 104 are at the same level.

In step 306, the first measuring device 11224 in the first measuring segment 11222 of the first optical fiber 11220 is assembled. The second measuring device 11424 in the second measuring segment 11422 of the second optical fiber 11420 is assembled. As shown in FIG. 1A, the first measuring device 11224 and the second measuring segment 11422 are Optical Bragg grating. The first optical fiber 11220, two first heat shrinking tubes 11230 and the first cable 11228 are provided in the first optical fiber sensing device 1122. Two ends of the first cable 11228 are connected to the two ends of the first optical fiber 11220 respectively through the first heat shrinking tubes 11230. The first measuring segment 11222 is located between the two first heat shrinking tubes 11230. One end of the first cable 11228 is coupled with the first stabilizing device 1120. One end of the first integrated system of full optical complete bridge monitoring 112 floats in the liquid through the first stabilizing device 1120. The first securing end 122 corresponds to the first heat shrinking tube 11230 of the first stabilizing device 1120. The first integrated system of full optical complete bridge monitoring 112 is fixed in the first acrylic tube 102 using the first heat shrinking tube 11230.

The second optical fiber 11420, two second heat shrinking tubes 11430 and the second cable 11428 are provided in the second optical fiber sensing device 1142. Two ends of the second cable 11428 are connected to the two ends of the second optical fiber 11420 respectively through the second heat shrinking tubes 11430. The second measuring segment 11422 is located between the two second heat shrinking tubes 11430. One end of the second cable 11428 is coupled with the second stabilizing device 1140. One end of the second integrated system of full optical complete bridge monitoring 114 floats in the liquid through the second stabilizing device 1140. The second securing end 124 corresponds to the second heat shrinking tube 11430 of the second stabilizing device 1140. The second integrated system of full optical complete bridge monitoring 114 is fixed in the second acrylic tube 104 by the second heat shrinking tube 11430.

In this embodiment, it further provides a first piping device 11226 and a second piping device 11426. In step 318, the first piping device 11226 covers the first optical fiber 11220 and the first measuring segment 11222 to protect the first optical fiber 11220 and the first measuring segment 11222. The first piping device 11226 is used to transmit a change to the first measuring segment 11222 of the first optical fiber sensing device 1122 when the force is applied to the first measuring segment 11222. The second piping device 11426 covers the second optical fiber 11420 and the second measuring segment 11422 to protect the second optical fiber 11420 and the second measuring segment 11422. The second piping 11426 is used to transmit a change to the second measuring segment 11422 of the second optical fiber sensor 1142 when the change strain is applied to the second measuring segment 11422.

In step 308, the first optical device 1124 is coupled with one end of the first optical fiber sensing device 1122. The first optical device 1124 emits an optical signal S1 into the first optical fiber 11220. The optical signal S1 is reflected by the first measuring segment 11222 to generate a reflected signal S2. The first optical device 1124 receives the reflected signal S2.

In step 310, the first signal processing device 1126 is coupled with the first optical device 1124. The second signal processing device 1146 is coupled with the second optical device 1144. In this embodiment, it further includes step 320 after the step 310. In step 320, the other end of the first optical fiber sensing device 1122 is coupled with the second optical fiber sensing device 1142.

In step 312, the first stabilizing device 1120 provides the first measuring segment 11222 a pre-determined tensile strength through the first optical fiber sensor 1122 so that the first measuring segment 11222 is maintained in the first status.

In step 314, a change is applied to the first measuring segment 11222 and the first measuring segment 11222 changes to the second status. In this embodiment, the altimeter 100 is installed between two piers of a bridge, and is used to measure the variation of the height of the piers. In another embodiment, the force also changes the joint spacing of the expansion gap. FIG. 3C is a schematic illustration of an altimeter being installed between two piers of a bridge. When the bridge piers 340 sinks, the first acrylic tube 102 also sinks. Therefore the first integrated system of full optical complete bridge monitoring 112 is pulled by the tensile force. The first optical fiber sensing device 1122 is also pulled down, prompts the first stabilizing device 1120 to pull the first optical fiber sensing device 1122.

The first leveling pipe 152 connects the first acrylic tube 102 and the second acrylic tube 104. The liquid level in the first acrylic tube 102 is the same as the liquid level in the second acrylic tube 104. The buoyant force of the first stabilizing device is greater when its immersed volume is higher and the level is deeper. The tensile strength of the first optical fiber sensor 1122 is changed. In the meantime, the first measuring segment 11222 changes from the first status to the second status. The first signal processing device 1126 converts the reflected signal S2 into a physical parameter, in step 316.

In step 322, the first integrated system of full optical complete bridge monitoring 112 provides the first communication device 1128. The first communication device 1128 is coupled with the first signal processing device 1126. The first signal processing device 1126 controls the first communication device 1128 to transmit a warning signal Sw to the cell phone U11 of the user end U1 when the reflected signal S2 changes. A voice message informs the safety status of the bridge. The first communication device 1128 sends the warning signal Sw through a wired or wireless network. It should be noted that the warning signal Sw is transmitted to the user in the form of SMS (Short Messages Service), e-mails or voice messages. FIG. 3E is a schematic illustration of the integrated system of full optical complete bridge monitoring with the smart phone speech warning function according to one embodiment of the present invention. Referring to FIG. 3E, the first communication device 1128 transmits the warning signal Sw to the cell phone U11 of the User U1 through the network. The first communication device 1128 also turns on the warning device 350 such as a warning light, the alarm, or the warning voice, so as to warn the nearby road users.

Figure 4B:
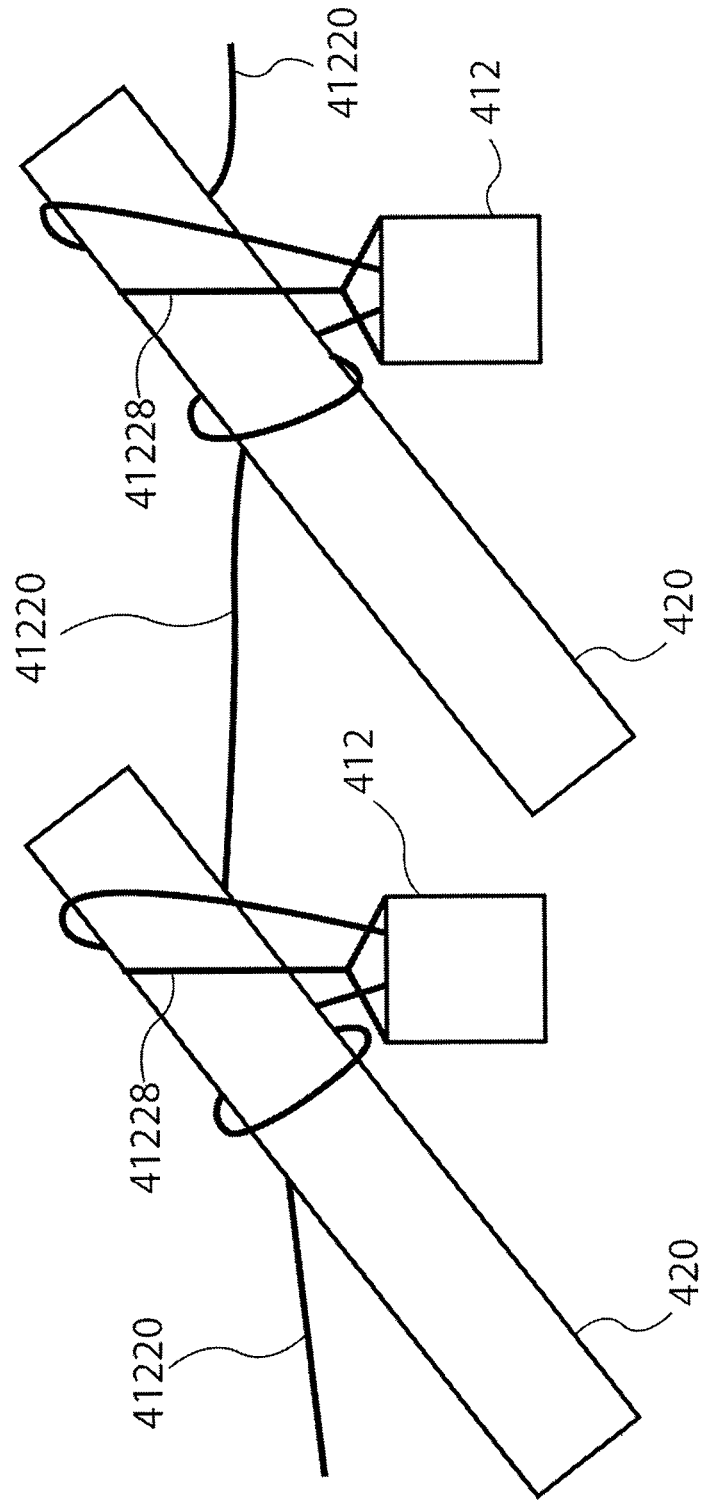
FIG. 4B is a schematic illustration of a steel wire vibration sensing device attached to a steel wire according to FIG. 4A.
Figure 4C:
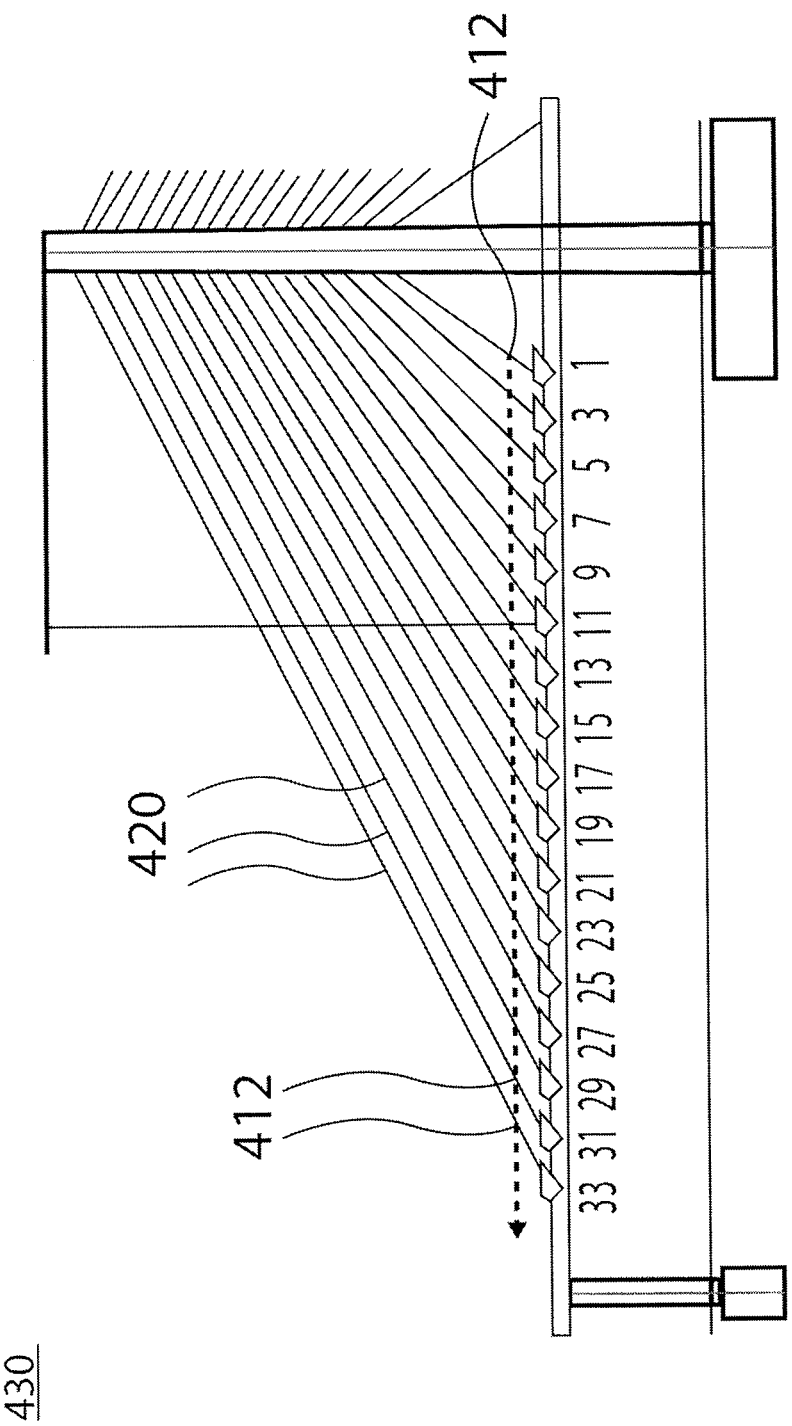
FIG. 4C is a schematic illustration of a steel wire vibration sensing device installed in a cable stayed bridge of FIG. 4A.

FIG. 4A is a schematic illustration of a steel wire vibration sensing device according to one embodiment of the present invention. FIG. 4B is a schematic illustration of a steel wire vibration sensing device of FIG. 4A hanging on a steel wire. FIG. 4C is a schematic illustration of a steel wire vibration sensing device installed on a cable stayed bridge. As illustrated, steel wire vibration monitoring device 412 is hung onto one of the steel wires on the cable stayed bridge where the vibration frequency is monitored.

In this embodiment, the structure of the wire vibration sensing device 412 is similar to the first integrated system of full optical complete bridge monitoring 112 of FIG. 1B. The difference is that the first stabilizing device 1120 in FIG. 1B is a floating device or Styrofoam, but the stabilizing device 4120 in this embodiment is a Styrofoam cylinder. As shown in FIG. 4A, the stabilizing device 4120 has the round metal block 4121 in water 450 as a weight. The round metal block receives gravity and it provides a pre-determined tensile force to the Optical Bragg grating 41224, so that the Optical Bragg grating is maintained in the first status. The heat shrinking tube 41230 on top of the Optical Bragg grating 41224 is fixed on supporting plate 440. Another heat shrinking tube 41230 under is connected to stabilizing device 4120 by the carbon fiber cable 41228. In this embodiment, the steel wire vibration monitoring device 412 has a different stabilizing device 412. The rest is the same as the integrated system of full optical complete bridge monitoring 112 of FIG. 1B and therefore details will not be discussed again.

Figure 4D:
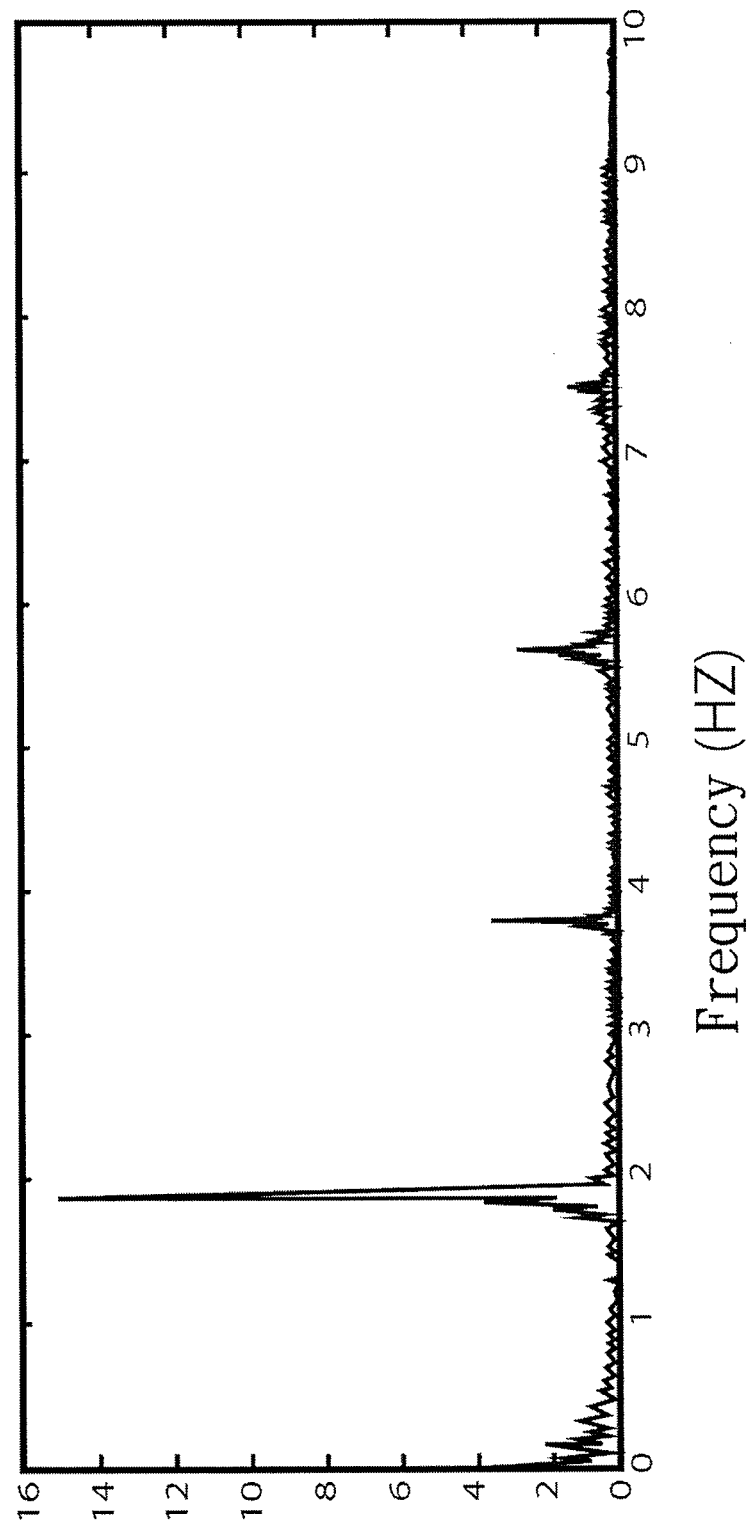
FIG. 4D is a vibration frequency diagram generated by a steel wire vibration sensing device according to 4A.
Figure 5:
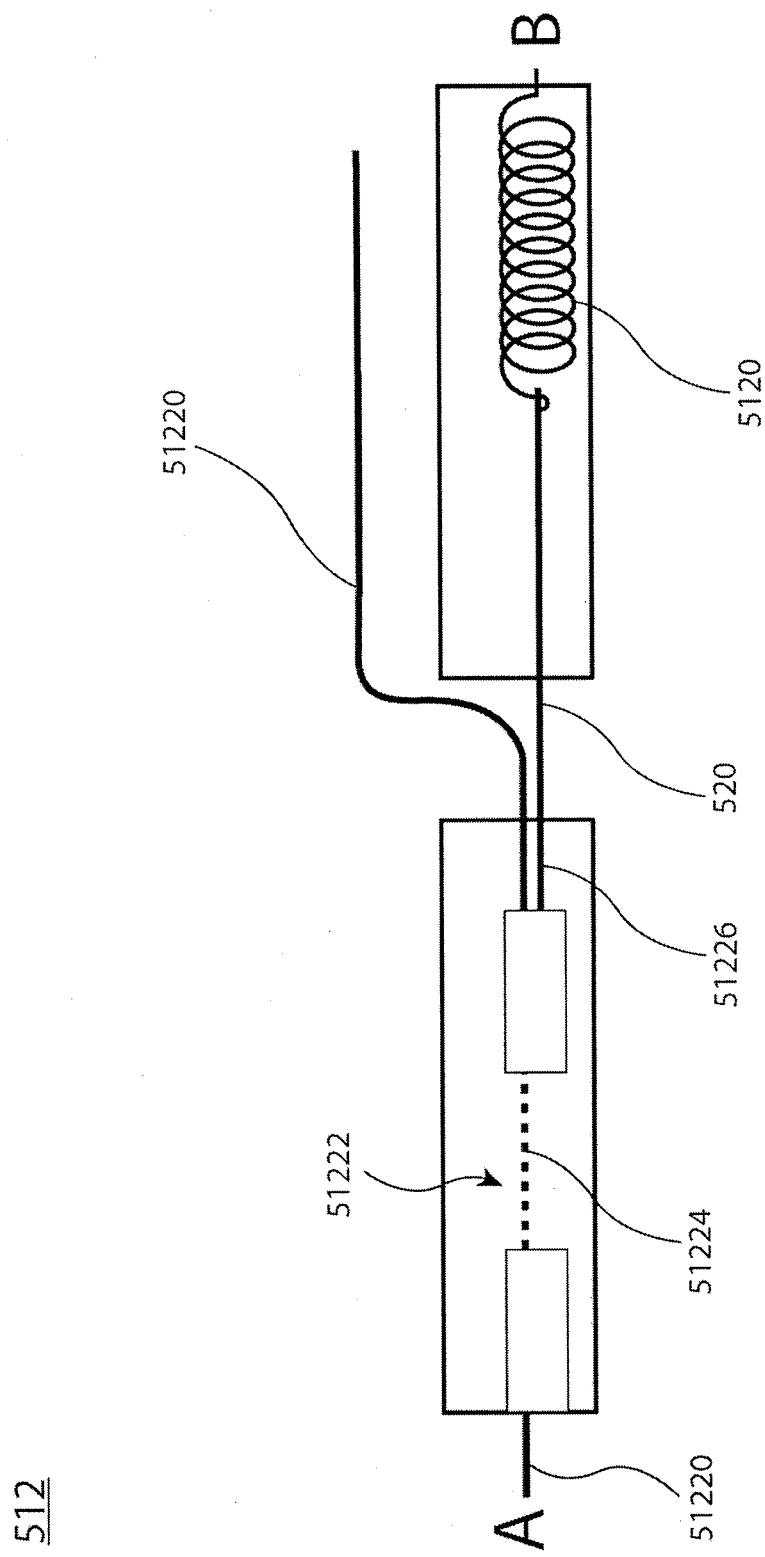
FIG. 5 is a schematic illustration of a displacement meter according to one embodiment of present invention.

The steel wire vibration monitoring device 412 hangs up on the wire 420 using a suspension wire 460, as shown in FIG. 4B. The wire vibration monitoring device 412 vibrates when the wire 420 is vibrating. Thus a change is provided to the Optical Bragg grating 41224 of the wire vibration monitoring device 412. The Optical Bragg grating changes to second status and generates a signal change in reflected signal S2 as shown in FIG. 4A. Then, signal processing device converts such signal changes to physical parameters (the frequency). The frequency can be converted to the tension T of the steel wire 420 and the vibration of the steel wire 420 is monitored in real time. The vibration of any steel wire 420 of the bridge can be measured immediately as shown in FIG. 4D. The above-mentioned tension is the tension of the wire, T, can be found using the following equation:

$$T = \frac{4WL^2}{g} f_1^2$$

where W: weight per unit length
L: length of wire
g: gravity
$f_1$: fundamental frequency of wire FIG. 5 is a schematic illustration of a displacement meter according to one embodiment of the present invention. One end of the displacement meter 512 is coupled with point B through the wire 520 and the stabilizing device 5120. The other end of the displacement meter 512 is coupled with the point A through the optical fiber 51220. The displacement meter 512 is used to measure the displacements of the point A with respect to the point B. In this embodiment, the structure of the displacement meter 512 is similar to the first integrated system of full optical complete bridge monitoring 112 in FIG. 1B. The difference between this embodiment and FIG. 1B is that the first stabilizing device 1120 in FIG. 1B is a floating device or a Styrofoam, but the stabilizing device 5120 in this embodiment is a buffering device or a spring. The pre-determined tensile force is provided to the measuring segment 51222 by the spring force of the stabilizing device 5120 so that the measuring segment 51222 is maintained in the first status. In this embodiment, the structure of the stabilizing device 5120 of the displacement meter 512 is different the rest is the same as the integrated system of full optical complete bridge monitoring system 112 in FIG. 1B, and therefore details will not be discussed.

The measuring segment 51222 of the displacement meter 512 is being pulled when the displacement between point A and point B occurs. The reflected signal changes when a force is applied to the measuring segment 51222. The measuring segment 51222 changes from the first status to the second status. The signal processing device converts the reflected signal S2 into a physical parameter. In this embodiment, the physical parameter is the amount of displacement so as to monitor the expansion joint 348. The measuring segment 51222 of the displacement meter 512 is being pulled and a change is generated when the expansion joint 348 is increased, as shown in FIG. 3D.

Figure 6A:
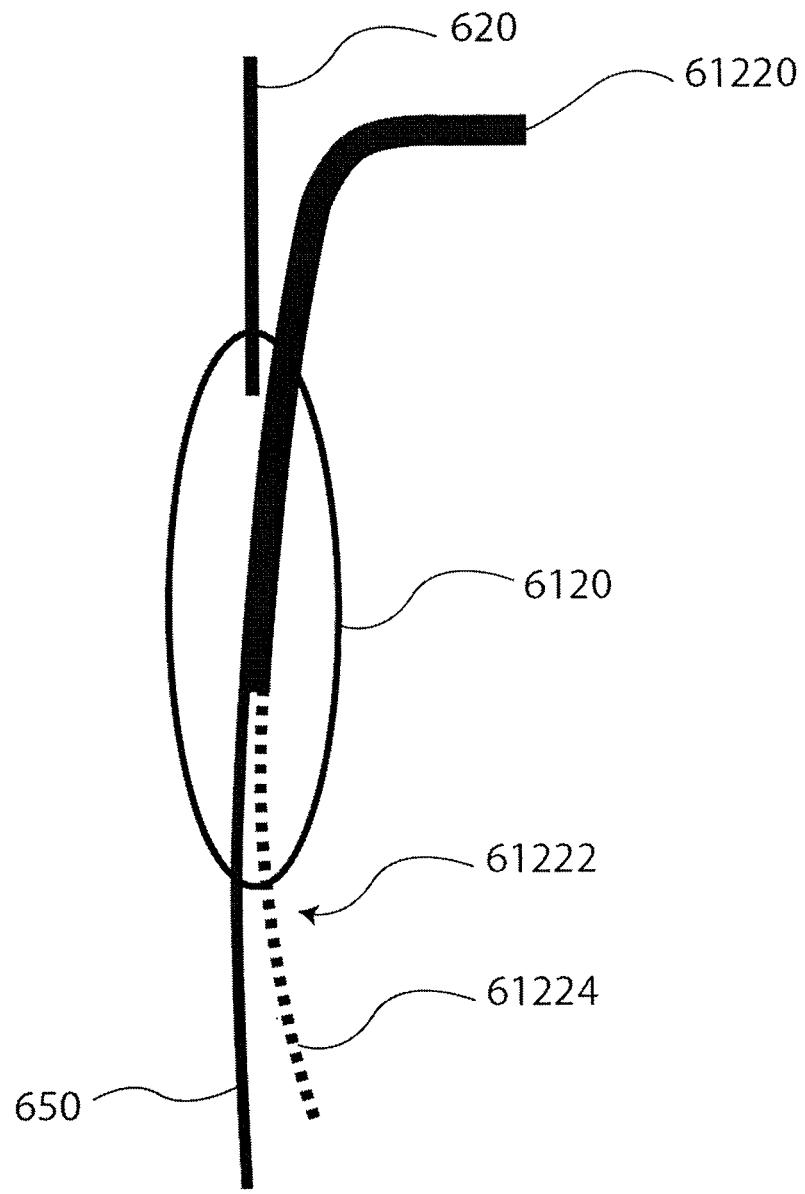
FIG. 6A is a schematic illustration of a water level gauge according to one embodiment of present invention.
Figure 6C:
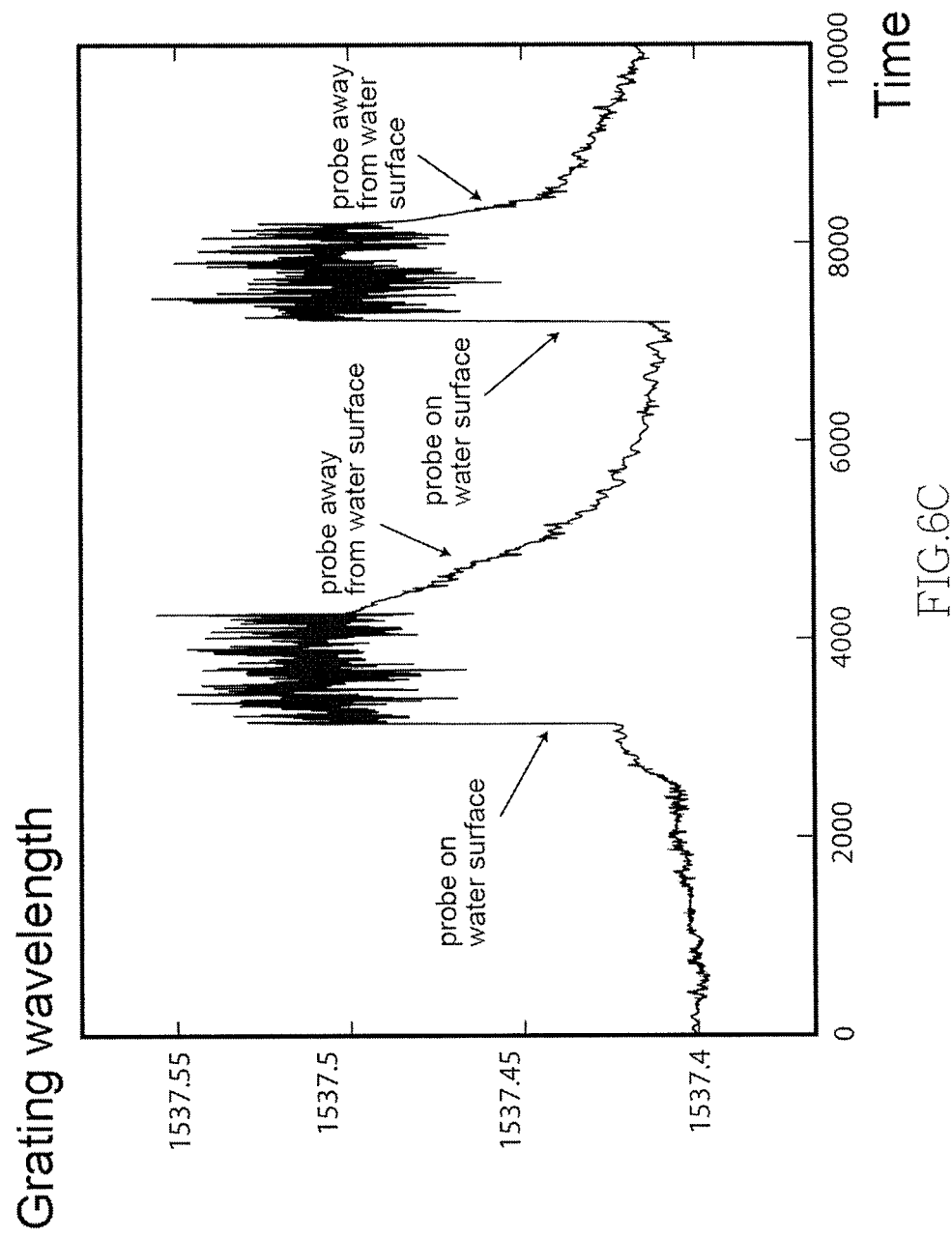
FIG. 6C is a wavelength diagram generated by the water level gauge of FIG. 6A.

FIG. 6A is a schematic illustration of a water level gauge according to one embodiment of the present invention. FIG. 6B is a schematic illustration of a water level gauge of FIG. 6A arranging on the bridge. The water level gauge 612 includes a stabilizing device 6120, an optical fiber 61220, a suspension wire 620, a measuring segment 61222, and a probe 650. The measuring segment 61222 includes an Optical Bragg grating 61224. The measuring segment 61222 adheres to the probe 650. The suspension wire 620 hangs downward on the guard rail 660 of the bridge. The measuring segment 61222 is stabilized by the stabilizing device 6120 with the gravity. The distance between the probe 650 and the surface of the river water 664 may be adjusted according to pre-determined warning water level. When the surface of the river water 664 rises, a change is applied to the measuring segment 61222 of the water level gauge 612. By measuring the wavelength of the Optical Bragg grating 61224, the time remaining till the water surface reaches the warning level can be calculated as shown in FIG. 6C.

The above-mentioned integrated system of full optical complete bridge monitoring uses the Optical Bragg grating of the optical fiber to measure. The variation of physical parameters is obtained from measuring the variation of reflected signals. The integrated system of full optical complete bridge monitoring is configured to be the altimeter, displacement meter, and steel wire vibration monitoring device to measure the bridge structure. It can also be used as part of other full optical complete bridge monitoring systems. The specifications and figures for various embodiments are illustrative rather than restrictive.

The integrated system of full optical complete bridge monitoring can also be used to obtain other physical parameters. Although present invention has been described with reference to specific exemplary embodiments, it is evident that various modifications may be made thereto without departing from the broader spirit and scope of present invention as set forth in the following claims.

I claim:

1. A sensing method including the following steps:
   (a) providing a stabilizing device, an optical fiber sensing device, an optical device, a signal processing device, and a connected pipe;
   (b) providing an optical fiber, two heat shrinking tubes, a cable in said optical fiber sensing device, and at least one measuring device is made in at least one of the plurality of measuring segments in said optical fiber; wherein the two ends of said cable and the ends of said optical fiber are joined by said heat shrinking tubes;
   said measuring segments are located between said heat shrinking tubes; and
   (c) one end of said cable is linked to said stabilizing device, and a securing end is composed opposite to said stabilizing device; connecting said optical device to one end of said optical fiber sensing device;
   wherein said optical device emits an optical signal into said optical fiber, and receives the reflected signal from said measuring segment;
   (d) coupling said signal processing device with said optical device;
   (e) connecting one end of said stabilizing device to the other end of said optical fiber sensing device and floating said stabilizing device in a liquid contained in the connected pipe, to provide said measuring segment a pre-determined tensile strength and maintain said measuring segment in a first status;
   (f) applying a force to said measuring segment to make said measuring segment change to the second status; said reflected signal produces a signal change during said measuring segment changes to second status; and
   (g) said signal processing device converts said signal change into physical parameters.

2. The method of claim 1, wherein said measuring device is a Fiber Bragg grating.

3. The method of claim 1, wherein said stabilizing device is a floating device or a styrofoam; the other end of said stabilizing device is connected to said cable of said optical fiber sensing device; and the measuring segment of said optical fiber receives said pre-determined tensile strength and maintains thereof in the first status.

4. The method of claim 1, further including steps of providing a communication device and connecting said communication device to said signal processing device, wherein said signal processing device controls said communication device to transmit a warning signal when said reflected signal produces a signal change.

5. The method of claim 4, wherein said communication device transmits said warning signals via a wired or wireless network.

6. The method of claim 5, wherein said warning signals are delivered to a user in the form of SMS (Short Text Messages), emails, voice mails or the combination thereof.

7. An altimeter, comprising:
   an integrated full optical fiber complete bridge safety monitoring system, for measuring a physical parameter, and
   a connected pipe filled with a liquid,
   wherein said integrated full optical fiber complete bridge safety monitoring system includes:
   a stabilizing device;
   an optical fiber sensing device, comprising:
      an optical fiber;
      two heat shrinking tubes that shrink when being heated;
      a cable, having two sides coupled with said heat shrinking tubes respectively and connecting said corresponding optical fiber;
      at least one measuring segment located between said heat shrinking tubes, and in said optical fiber, one end of said cable is coupled with said stabilizing device and the other opposite to said stabilizing device is a secured end; and
      a measuring device located in said measuring segment of said optical fiber;
   an optical device located in one end of said optical fiber sensing device, said optical device emits an optical signal into said optical fiber and receives reflected signals from said measuring segment; and
   a signal processing device coupled with said optical device;
   wherein said stabilizing device floats in the liquid contained in the connected pipe and one end of said stabilizing device is connected to one end of said optical sensing device to provide a pre-determined tensile strength to said measuring segment when said measuring segment is in the first status, said measuring segment is in a second status when a force is applied to said measuring segment, and when a reflected signal is generated, then said signal processing device converts said reflected signal into said physical parameters.

8. The altimeter of said claim 7, wherein said measuring device is a Fiber Bragg grating.

9. The altimeter of said claim 7, wherein said stabilizing device is a floating device or a styrofoam, the other end of said stabilizing device is connected to said cable of said optical fiber sensing device, said stabilizing device provides a buoyant force to said cable, said measuring segment of said optical fiber receives said pre-determined tensile strength, so that said measuring segment is in said first status.

10. The altimeter of said claim 7, further includes a pipe for covering said optical fiber and said measuring segment to spread said strain to said measuring segment of said optical fiber sensing device.

11. The altimeter of said claim 7, wherein said stabilizing device is a counterweight or a block of lead; the other end of said stabilizing device is coupled with said cable of said optical fiber sensing device; said stabilizing device provides a gravity to said cable, said measuring segment of said optical fiber; and said measuring segment of said fiber receive said pre-determined tensile strength, so that said measuring segment maintains thereof in said first status.

12. The altimeter of said claim 7, wherein said physical parameter includes a distance, a vibrating frequency, a level height, a height difference, and a weight.

13. The altimeter of said claim 7, further includes a communication device coupled with said signal processing device, said signal processing device controlled said communication device to send a warning signal, when said reflected signal generates said signal changes.

14. The altimeter of said claim 13, wherein said communication device transmit said warning signal via a wired or wireless network.

15. The altimeter of said claim 13, wherein said warning signals are sent to a user in the form of messages, emails, voice mails or the combination thereof.

16. The method of claim 1, wherein in the step (f), said measuring segment changes to the second status when an immersed volume of said stabilizing device in the liquid changes according to a connected pipe principle and thus said force is applied to said measuring segment.

17. The method of claim 1, wherein the connected pipe comprising a first tube, a second tube and a leveling pipe that connects the first tube and the second tube, and in the step (f), said measuring segment changes to the second status when one of the first tube and the second tube sinks relatively to the other and thus said force is applied to said measuring segment.

18. The altimeter of claim 7, wherein said measuring segment is in the second status when an immersed volume of said stabilizing device in the liquid changes according to a connected pipe principle and thus said force is applied to said measuring segment.

19. The altimeter of claim 7, wherein the connected pipe comprising a first tube, a second tube and a leveling pipe that connects the first tube and the second tube, and said measuring segment is in the second status when one of the first tube and the second tube sinks relatively to the other and thus said force is applied to said measuring segment.

* * * * *